US012563222B2

(12) United States Patent
Joshi et al.

(10) Patent No.: US 12,563,222 B2
(45) Date of Patent: Feb. 24, 2026

(54) PACKING OF DISPLACEMENTS DATA IN VIDEO FRAMES FOR DYNAMIC MESH CODING

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 18/481,674

(22) Filed: Oct. 5, 2023

(65) Prior Publication Data

US 2024/0137548 A1    Apr. 25, 2024
US 2024/0236355 A9    Jul. 11, 2024

Related U.S. Application Data

(60) Provisional application No. 63/522,343, filed on Jun. 21, 2023, provisional application No. 63/461,997, (Continued)

(51) Int. Cl.
*H04N 7/12* (2006.01)
*H04N 19/136* (2014.01)
(Continued)

(52) U.S. Cl.
CPC ......... *H04N 19/463* (2014.11); *H04N 19/136* (2014.11); *H04N 19/186* (2014.11)

(58) Field of Classification Search
CPC .. H04N 19/463; H04N 19/136; H04N 19/186; H04N 19/597; H04N 19/70
See application file for complete search history.

(56) References Cited

U.S. PATENT DOCUMENTS

| | | | | | |
|---|---|---|---|---|---|
| 2004/0012602 A1* | 1/2004 | Mech | ...................... | G06T 15/04 | |
| | | | | 345/581 | |
| 2011/0280316 A1* | 11/2011 | Chen | ...................... | H04N 19/61 | |
| | | | | 375/E7.076 | |

(Continued)

FOREIGN PATENT DOCUMENTS

| | | |
|---|---|---|
| JP | 2022008408 A | 1/2022 |
| KR | 10-2238091 B1 | 4/2021 |

(Continued)

OTHER PUBLICATIONS

"V-Mesh Test Model v1," WG 7, MPEG 3D Graphics and Haptics Coding, ISO/IEC JTC 1/SC 29/WG 7 N00404, Jul. 2022, 15 pages.

(Continued)

*Primary Examiner* — Gims S Philippe

(57) ABSTRACT

An apparatus includes a communication interface configured to receive a bitstream for a compressed video and a processor operably coupled to the communication interface. The processor is configured to identify a video format for the compressed video. The processor is also configured to determine, from one or more of at least one signaling element and the identified video format, a displacement data packing arrangement. The processor is also configured to retrieve displacement data according to the determined displacement data packing arrangement.

20 Claims, 18 Drawing Sheets

Related U.S. Application Data filed on Apr. 26, 2023, provisional application No. 63/460,358, filed on Apr. 19, 2023, provisional application No. 63/454,853, filed on Mar. 27, 2023, provisional application No. 63/439,786, filed on Jan. 18, 2023, provisional application No. 63/439,486, filed on Jan. 17, 2023, provisional application No. 63/439,004, filed on Jan. 13, 2023, provisional application No. 63/438,564, filed on Jan. 12, 2023, provisional application No. 63/417,588, filed on Oct. 19, 2022.

(51) Int. Cl.
  *H04N 19/186*      (2014.01)
  *H04N 19/463*      (2014.01)

(56)              References Cited

U.S. PATENT DOCUMENTS

| | | | |
|---|---|---|---|
| 2014/0092998 A1* | 4/2014 | Zhu | H04N 23/84 375/240.26 |
| 2015/0208095 A1* | 7/2015 | Schierl | H04N 21/234327 375/240.28 |
| 2018/0167631 A1* | 6/2018 | Schulze | H04N 21/4302 |
| 2019/0007669 A1* | 1/2019 | Kim | H04N 23/698 |
| 2019/0068949 A1* | 2/2019 | Wang | H04N 13/139 |
| 2021/0029340 A1 | 1/2021 | Wu et al. | |
| 2021/0287431 A1 | 9/2021 | Woop et al. | |
| 2021/0307259 A1* | 10/2021 | Setlur | A01G 9/26 |
| 2023/0152672 A1* | 5/2023 | Bidwell | G02B 7/14 396/419 |
| 2023/0353770 A1 | 11/2023 | Kang et al. | |
| 2023/0410374 A1 | 12/2023 | Ahn et al. | |
| 2024/0022766 A1 | 1/2024 | Ahn et al. | |

FOREIGN PATENT DOCUMENTS

| | | |
|---|---|---|
| KR | 10-2021-0116199 A | 9/2021 |
| KR | 10-2022-0036974 A | 3/2022 |
| KR | 10-2022-0126225 A | 9/2022 |
| KR | 10-2022-0137548 A | 10/2022 |
| WO | 2022045717 A1 | 3/2022 |

OTHER PUBLICATIONS

"WD 2.0 of V-DMC," MPEG 3D Graphics and Haptics Coding, ISO/IEC JTC 1/SC 29/WG 7 N00546, Jan. 2023, 76 pages.
"WD 3.0 of V-DMC," MPEG 3D Graphics and Haptics Coding, ISO/IEC JTC 1/SC 29/WG 07 N00611, Apr. 2023, 142 pages.
"WD 4.0 of V-DMC," MPEG 3D Graphics and Haptics Coding, ISO/IEC JTC 1/SC 29/WG 07 N00611, Aug. 2023, 145 pages.
International Search Report and Written Opinion issued Jan. 25, 2024 regarding International Application No. PCT/KR2023/016175, 9 pages.

* cited by examiner

500

4:4:4 Video Frame

Luma        Cr        Cb

500

Video Frame Other than 4:4:4

Luma packing_type = SAME_PLANE

4:4:4 Video Frame packing_type = SEPARATE_PLANES

4:2:0 Video Frame packing_type = SAME_PLANE

700

4:2:0 Video Frame

| X | Y | Z | X | Y | Z | X | Y | Z |
|---|---|---|---|---|---|---|---|---|
| X | Y | Z | X | Y | Z | X | Y | Z |
| X | Y | Z | X | Y | Z | X | Y | Z |
| X | Y | Z | X | Y | Z | X | Y | Z |
| X | Y | Z | X | Y | Z | X | Y | Z |
| X | Y | Z | X | Y | Z | X | Y | Z |

Cr        Cb

Luma packing_type = SAME_PLANE
interleaving_flag = INTERLEAVED

800

4:2:0 Video Frame

X

Y

Z

Z

Luma        Cr        Cb packing_type = FULL_420_PACKING

1100

1100

1200

1300

1400

1500

1600

1700

4:2:0 Video Frame

1800

4:2:0 Video Frame

| Submesh0 X |
| --- |
| Submesh0 Y |
| Submesh0 Z |
| Submesh0 Padding |
| Submesh1 X |
| Submesh1 Y |
| Submesh1 Z |
| Submesh1 Padding |

Luma

Cr

Cb

1900

4:2:0 Video Frame

| Submesh0 X |
| :---: |
| Submesh0 Y |
| Submesh0 Z |
| Submesh1 X |
| Submesh1 Y |
| Submesh1 Z |
| Padding |

Luma

Cr

Cb

2000

4:2:0 Video Frame

| Submesh0 X |
| --- |
| Submesh1 X |
| Submesh0 Y |
| Submesh1 Y |
| Submesh0 Z |
| Submesh1 Z |
| Padding |

Luma

Cr

Cb

PACKING OF DISPLACEMENTS DATA IN VIDEO FRAMES FOR DYNAMIC MESH CODING

CROSS-REFERENCE TO RELATED APPLICATION AND PRIORITY CLAIM

This application claims priority under 35 U.S.C. § 119(e) to U.S. Provisional Patent Application No. 63/417,588 filed on Oct. 19, 2022, U.S. Provisional Patent Application No. 63/438,564 filed on Jan. 12, 2023, U.S. Provisional Patent Application No. 63/439,004 filed on Jan. 13, 2023, U.S. Provisional Patent Application No. 63/439,486 filed on Jan. 17, 2023, U.S. Provisional Patent Application No. 63/439,786 filed on Jan. 18, 2023, U.S. Provisional Patent Application No. 63/454,853 filed on Mar. 27, 2023, U.S. Provisional Patent Application No. 63/460,358 filed on Apr. 19, 2023, U.S. Provisional Patent Application No. 63/461,997 filed on Apr. 26, 2023, and U.S. Provisional Patent Application No. 63/522,343 filed on Jun. 21, 2023, which are hereby incorporated by reference in their entirety.

TECHNICAL FIELD

This disclosure relates generally to multimedia devices and processes. More specifically, this disclosure relates to improved packing of displacements data in video frames for dynamic mesh coding.

BACKGROUND

Three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

SUMMARY

This disclosure provides packing of displacements data in video frames for dynamic mesh coding.

In a first embodiment, an apparatus includes a communication interface configured to receive a bitstream for a compressed video and a processor operably coupled to the communication interface. The processor is configured to identify a video format for the compressed video. The processor is also configured to determine, from one or more of at least one signaling element and the identified video format, a displacement data packing arrangement. The processor is also configured to retrieve displacement data according to the determined displacement data packing arrangement.

In a second embodiment, a method includes identifying, from a format variable, a video format for a compressed video of a received bitstream. The method also includes determining, from one or more of at least one signaling element and the identified video format, a displacement data packing arrangement. The method also includes retrieving displacement data according to the determined displacement data packing arrangement.

In a third embodiment, an apparatus includes a communication interface and a processor operably coupled to the communication interface. The processor is configured to determine a video format for a video. The processor is also configured to set at least one signaling element for the video, wherein at least one signaling element is used to identify a displacement data packing arrangement for displacement data. The processor is also configured to encode the video into a compressed video bitstream according to the displacement data packing arrangement.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
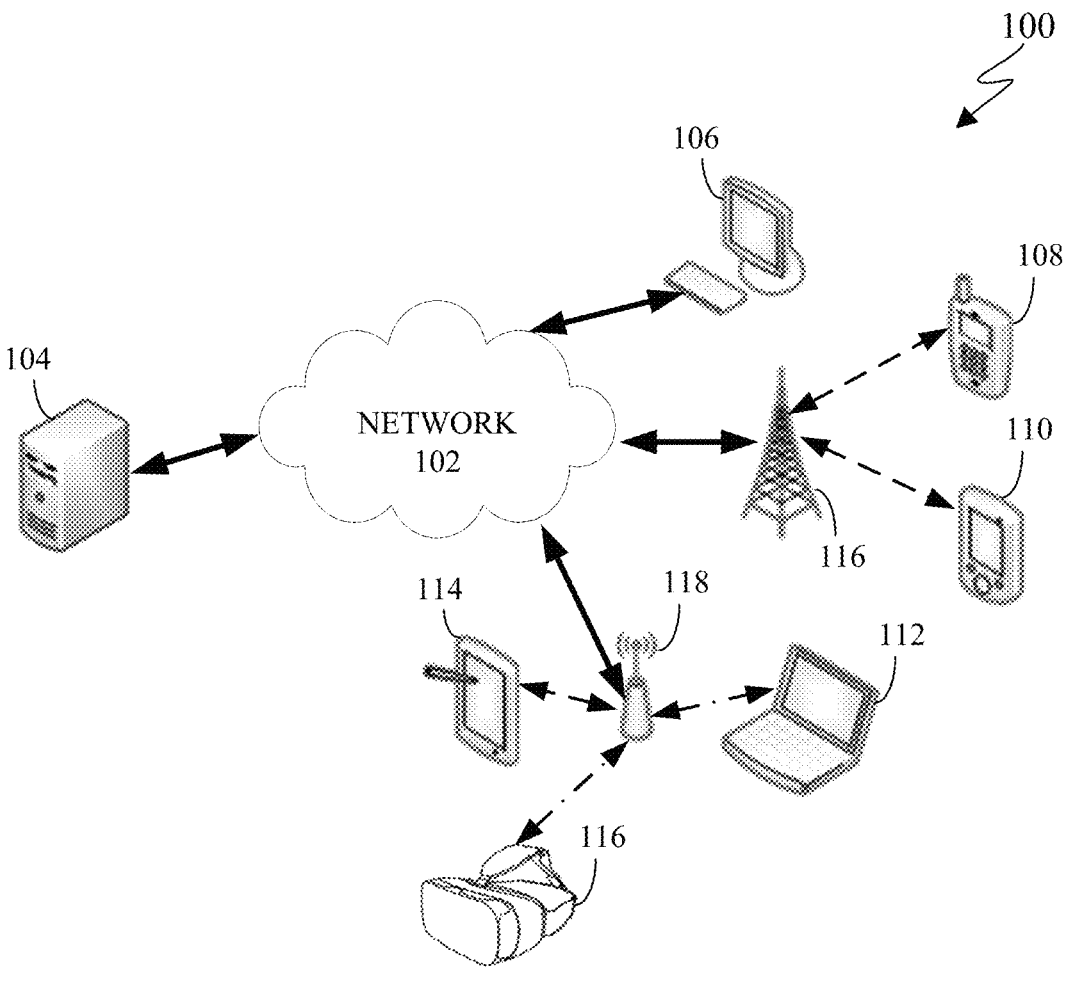
FIG. 1 illustrates an example communication system in accordance with this disclosure.

FIGS. 1 through 22, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, three hundred sixty degree (360°) video and three dimensional (3D) volumetric video are emerging as new ways of experiencing immersive content due to the ready availability of powerful handheld devices such as smartphones. While 360° video enables an immersive "real life," "being-there," experience for consumers by capturing the 360° outside-in view of the world, 3D volumetric video can provide a complete six degrees of freedom (DoF) experience of being immersed and moving within the content. Users can interactively change their viewpoint and dynamically view any part of the captured scene or object they desire. Display and navigation sensors can track head movement of a user in real-time to determine the region of the 360° video or volumetric content that the user wants to view or interact with. Multimedia data that is 3D in nature, such as point clouds or 3D polygonal meshes, can be used in the immersive environment. This data can be stored in a video format and encoded and compressed for transmission as a bitstream to other devices.

A point cloud is a set of 3D points along with attributes such as color, normal directions, reflectivity, point-size, etc. that represent an object's surface or volume. Point clouds are common in a variety of applications such as gaming, 3D maps, visualizations, medical applications, augmented reality, virtual reality, autonomous driving, multi-view replay, and six degrees of freedom (DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud, often requires specialized hardware. To avoid specialized hardware to compress a 3D point cloud, a 3D point cloud can be transformed into traditional two-dimensional (2D) frames and that can be compressed and later reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively. Since point clouds and meshes contain a large amount of data, they require compression for efficient storage and transmission. This is particularly true for dynamic point clouds and meshes, which may contain 60 frames or higher per second.

As part of an encoding process, a base mesh can be generated using an existing mesh, and a reconstructed base mesh can be constructed from the coded base mesh. The base mesh typically contains smaller number of vertices compared to the original mesh. The reconstructed base mesh can then be subdivided into one or more subdivided meshes and a displacement field is created for each subdivided mesh. For example, if the reconstructed base mesh includes triangles covering the surface of the 3D object, the triangles are subdivided according to a number of subdivision levels, such as to create a first subdivided mesh in which each triangle of the reconstructed base mesh is subdivided into four triangles, a second subdivided mesh in which each triangle of the reconstructed base mesh is subdivided into sixteen triangles, and so on, depending on how many subdivision levels are applied. Each displacement field represents the difference between vertex positions of the original mesh and the subdivided mesh associated with the displacement field. That is, each displacement for each of the subdivisions is calculated for the additional vertices introduced by the subdivision process. Each displacement field is wavelet transformed to create level of detail (LOD) signals that are encoded as part of a compressed bitstream. During decoding, the displacements of each displacement field are added to their associated subdivided mesh to recreate the original mesh.

The quantized LOD signals can be packed into a 2D image/video, and can be compressed losslessly by using an image/video encoder (such as HEVC). Or alternatively, the unquantized LOD signals may be packed into a 2D image/video and then compressed in a lossy manner by using an image/video encoder (such as HEVC). Currently, 4:4:4 video format is used to store the x, y, and z components (normal, tangent, and bitangent components). For example, the x-component would be stored in the Y plane, the y-component would be stored in the Cb plane, and the z-component would be stored in the Cr plane in the 4:4:4 video format, with the Y, Cb, and Cr planes having the same width and height. In some cases, depending on the color space used, the x-component is stored in the R plane, the y-component is stored in the G plane, and the z-component is stored in the B plane. However, video encoder and decoders that can operate on 4:4:4 format video are not widely available, especially in hardware, limiting the usefulness of this approach since many devices executing the encoders or decoders are not compatible to even use the 4:4:4 video format. Therefore, there is a need to use different video formats to store the x, y, and z components of the displacement data in video frames and to efficiently and effectively determine how the components should be stored in the video frame and according to the video format.

This disclosure provides improved techniques for the packing of displacements data in video frames for dynamic mesh coding. Depending on the video format used, this disclosure provides methods for storing the x, y, and z components of the displacement data in video frames so that 4:4:4 video format compatible encoders and decoders are not required and so that encoders and decoders compatible with other, more common, formats such as 4:2:0, 4:2:2, and 4:0:0 video formats can be used. This disclosure further provides techniques involving identifying a video format for the compressed video, and determining a displacement data packing arrangement (such as different schemes to pack the x, y, and z components in different planes of the video frame) based on the identified video format, as well based on other factors.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder. In certain embodiments, the server 104 can utilize displacement data packing schemes based on video format and/or other factors to improve coding of displacements.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can compress a 3D point cloud or mesh to generate a bitstream and then transmit the bitstream to one or more of the client devices 106-116. As another example, one of the client devices 106-116 can compress a 3D point cloud or mesh to generate a bitstream and then transmit the bitstream to another one of the client devices 106-116 or to the server 104. In accordance with this disclosure, the server 104 and/or the client devices 106-116 can utilize displacement data packing schemes based on video format and/or other factors to improve coding of displacements.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
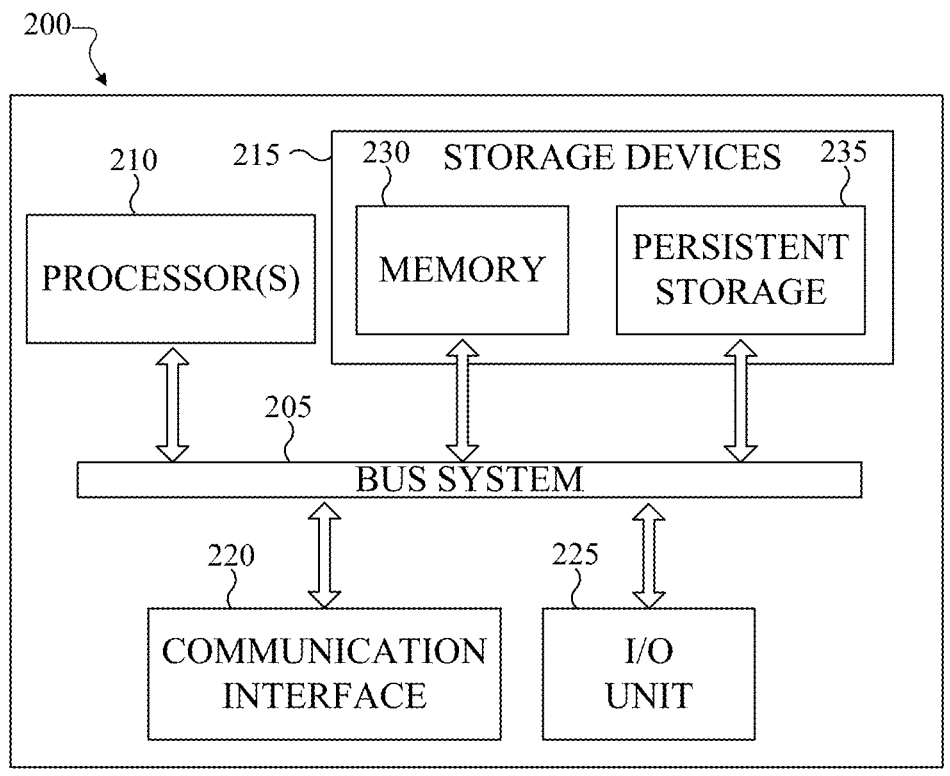
FIGS. 2 and 3 illustrate example electronic devices in accordance with this disclosure.
Figure 3:
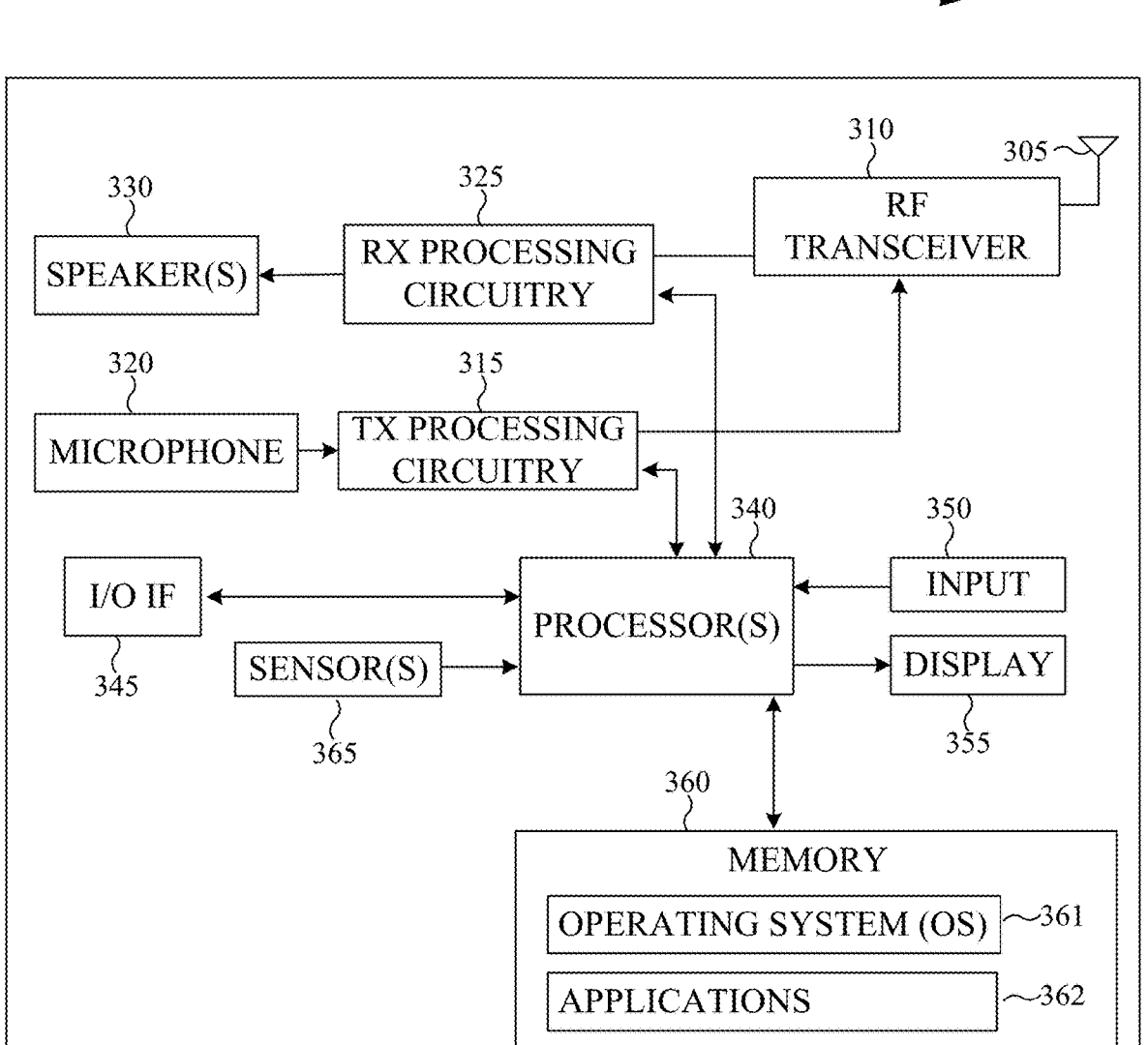

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can utilize displacement data packing schemes based on video format and/or other factors to improve coding of displacements.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 downconverts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can utilize displacement data packing schemes based on video format and/or other factors to improve coding of displacements.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
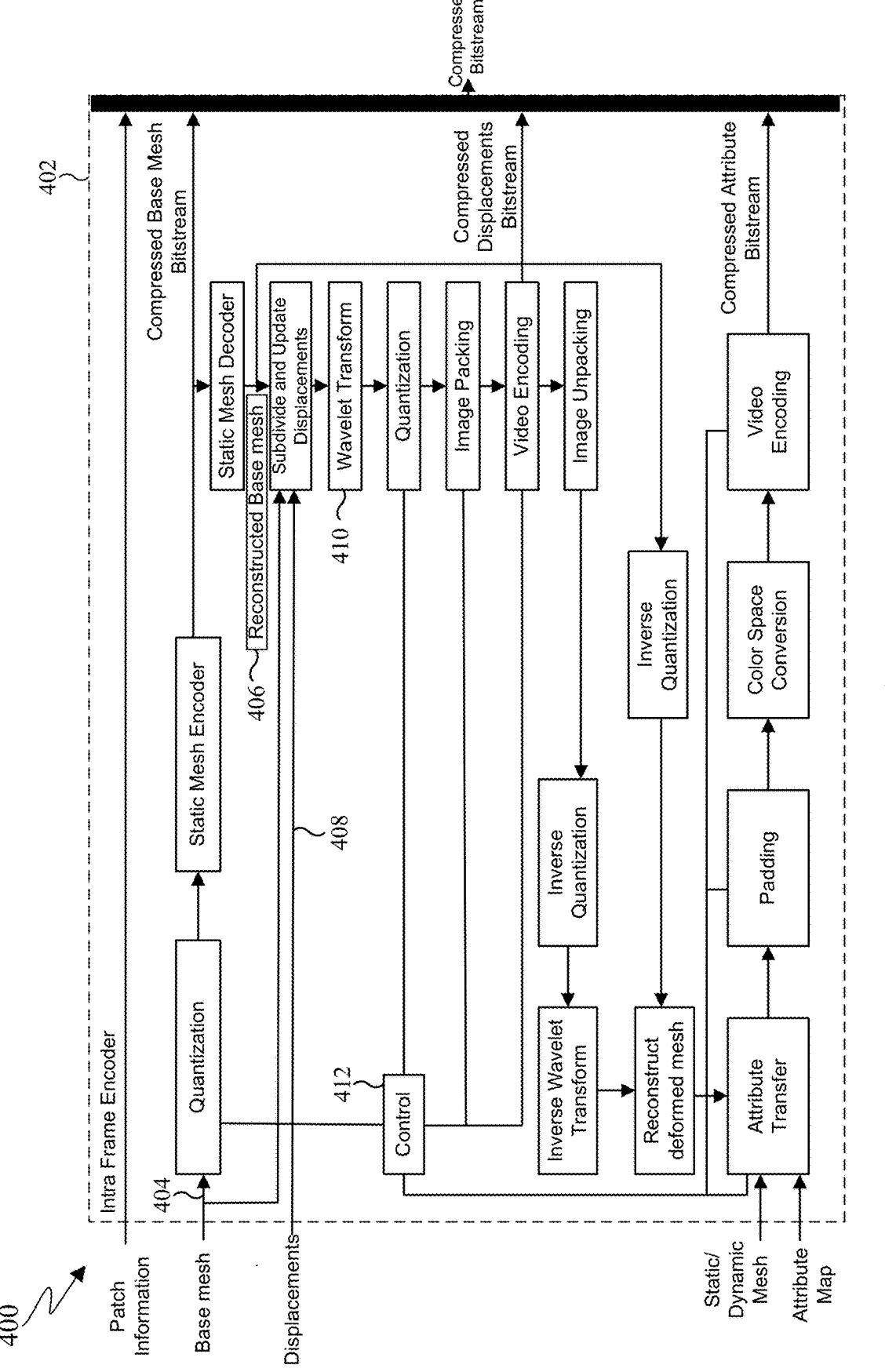
FIG. 4 illustrates an example intra-frame encoding process in accordance with this disclosure.

FIG. 4 illustrates an example intra-frame encoding process 400 in accordance with this disclosure. The intra-frame encoding process 400 illustrated in FIG. 4 is for illustration only. FIG. 4 does not limit the scope of this disclosure to any particular implementation of an intra-frame encoding process.

As shown in FIG. 4, the intra-frame encoding process 400 encodes a mesh frame using an intra-frame encoder 402. The intra-frame encoder 402 can be represented by, or executed by, the server 200 shown in FIG. 2 or the electronic device 300 shown in FIG. 3. A base mesh 404, which typically has a smaller number of vertices compared to the original mesh, is created and is quantized and compressed in either a lossy or lossless manner, and then encoded as a compressed base mesh bitstream. As shown in FIG. 4, a static mesh decoder decodes and reconstructs the base mesh, providing a reconstructed base mesh 406. This reconstructed base mesh 406 then undergoes one or more levels of subdivision and a displacement field is created for each subdivision representing the difference between the original mesh and the subdivided reconstructed base mesh. In inter-coding of a mesh frame, the base mesh 404 is coded by sending vertex motions instead of compressing the base mesh directly. In either case, a displacement field 408 is created. Each displacement of the displacement field 408 has three components, denoted by x, y, and z. These may be with respect to a canonical coordinate system or a local coordinate system where x, y, and z represent the displacement in local normal, tangent, and bi-tangent directions. It will be understood that multiple levels of subdivision can be applied, such that multiple subdivided mesh frames are created and a displacement field for each subdivided mesh frame is also created.

Let the number of 3-D displacement vectors in a displacement 408 of a mesh-frame be N. Let the displacement field be denoted by $d(i)=[d_x(i), d_y(i), d_z(i)]$, $0 \le i < N$. The displacement fields 408 undergo one or more levels of wavelet transformation 410 to create level of detail (LOD) signals $d^k(i)$, $i=0 \le i < N^k$, $0 \le k < numLOD$, where k denotes the index of the level of detail, $N^k$ denotes the number of samples in the level of detail signal at level k, and numLOD denotes the number of LODs. The LOD signals d k (i) may be scalar quantized.

As shown in FIG. 4, the quantized LOD signals corresponding to the displacement fields 408 are coded into a compressed bitstream. In various embodiments, the quantized LOD signals are packed into a 2D image/video using an image packing operation, and are compressed losslessly by using an image or video encoder. However, it is possible to use another entropy coder such as an asymmetric numeral systems (ANS) coder or a binary arithmetic entropy coder to code the quantized LOD signals. There may be other dependencies based on previous samples, across components, and across LODs that may be exploited. It is also possible that unquantized LOD signals are packed into a 2D image/video using an image packing operation and then compressed in a lossy manner by an image or video encoder.

Historically, the 4:4:4 video format is used to store the x, y, and z components (normal, tangent, bitangent) of the LOD signals. The x-component would be stored in the Y plane, the y-component would be stored in the Cb plane, and the z-component would be stored in the Cr plane in the 4:4:4 video format, with the Y, Cb, and Cr planes having the same width and height. In some cases, depending on the color space used, the x-component is stored in the R plane, the y-component is stored in the G plane, and the z-component is stored in the B plane, with the R, G, and B planes having the same width and height. However, video encoder and decoders that can operate on 4:4:4 format video are not widely available, especially in hardware, limiting the usefulness of this approach since many devices executing the encoders or decoders are not compatible to even use the 4:4:4 video format. Therefore, as further described below, this disclosure provides for different video formats to be used and for different component packing arrangements to be used based on the video format and/or other factors.

As also shown in FIG. 4, image unpacking of the LOD signals is performed and an inverse quantization operation and an inverse wavelet transform operation are performed to reconstruct the LOD signals. Another inverse quantization operation may be performed on the reconstructed base mesh 406, which is combined with the reconstructed LOD signals to reconstruct a deformed mesh. An attribute transfer operation is performed using the deformed mesh, a static/dynamic mesh, and an attribute map. A point cloud is a set of 3D points along with attributes such as color, normals, reflectivity, point-size, etc. that represent an object's surface or volume. These attributes are encoded as a compressed attribute bitstream. As shown in FIG. 4, the encoding of the compressed attribute bitstream may also include a padding operation, a color space conversion operation, and a video encoding operation. The various functions or operations shown in FIG. 4 can be controlled by a control process 412. The intra-frame encoding process 400 outputs a compressed bitstream that can, for example, be transmitted to, and decoded by, an electronic device such as the server 104 or the client devices 106-116. As shown in FIG. 4, the output compressed bitstream can include the compressed base mesh bitstream, the compressed displacements bitstream, and the compressed attribute bitstream.

Although FIG. 4 illustrates a block diagram of an example intra-frame encoding process 400, various changes may be made to FIG. 4. For example, the number and placement of various components of the intra-frame encoding process 400 can vary as needed or desired. In addition, the intra-frame encoding process 400 may be used in any other suitable process and is not limited to the specific processes described above. In certain embodiments, only the first (x) component of the displacement may be created and coded and the other two components (y and z) may be assumed to be 0. In such a case, a flag may be signaled in the bitstream to indicate that the bitstream contains only data corresponding to the first (x) component and the other two components (y and z) should be assumed to be zero when decompressing and reconstructing the displacement field 408. As another example, the intra-frame encoding process 400 of FIG. 4 can include using a packing technique based on video format of the video being compressed as well as other factors, as described in this disclosure.

Figure 5A:
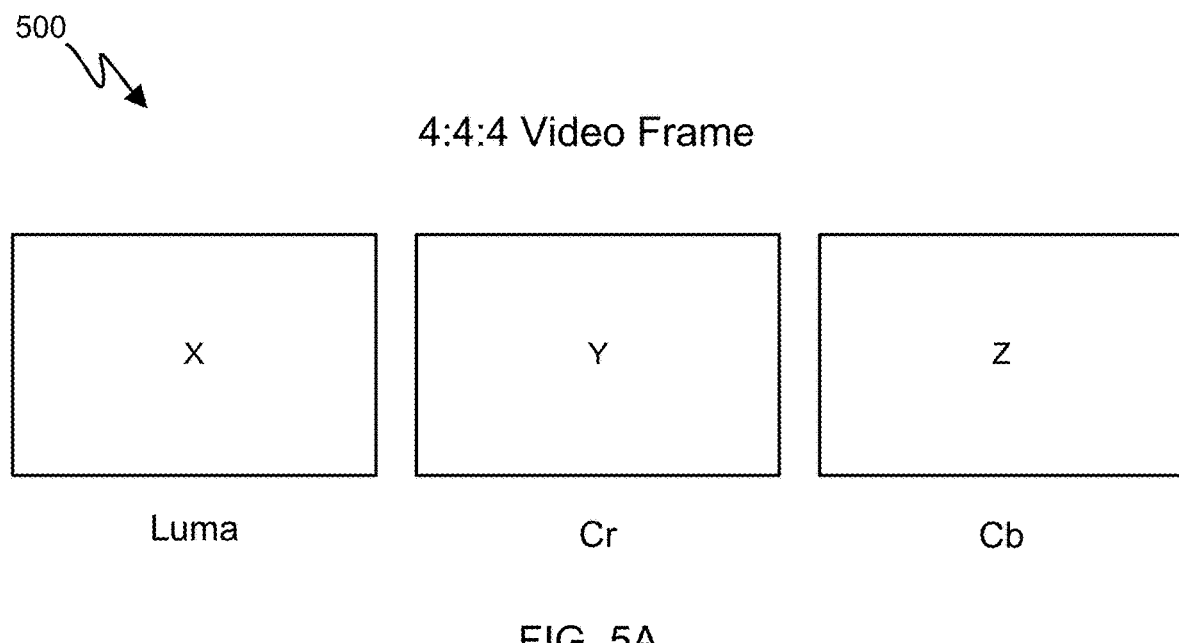
FIGS. 5A and 5B illustrate an example packing arrangement process based on video format in accordance with this disclosure.
Figure 5B:
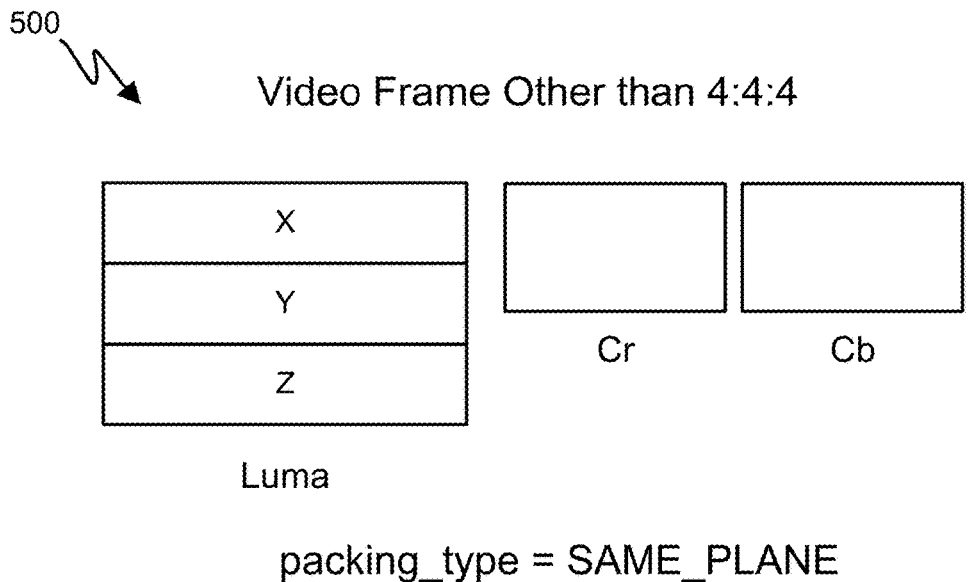

FIGS. 5A and 5B illustrate an example packing arrangement process 500 based on video format in accordance with this disclosure. The example packing arrangement process 500 illustrated in FIGS. 5A and 5B is for illustration only. For ease of explanation, the packing arrangement process 500 of FIGS. 5A and 5B may be described as being performed using the electronic device 300 of FIG. 3. However, the example packing arrangement process 500 may be used with any other suitable system and any other suitable electronic device, such as the server 200.

As shown in FIGS. 5A and 5B, the packing of the x, y, z, displacement data can depend on the video format of the video frame used to store the displacement data. As shown in FIG. 5A, in this example, when the video format is determined to be in the 4:4:4 video format, the x-component of the displacement map is stored in the Y (or luma) plane, the y-component of the displacement map is stored in the Cb plane, and the z-component of the displacement map is stored in the Cr plane. Throughout this disclosure, the terms luma, luminance and Y (as in YcbCr format) may be used interchangeably. As shown in FIG. 5B, when the video format is determined to be in a video format other than the 4:4:4 video format the components are stored in the same plane, such as storing the x-component of the displacement map in the luma plane, storing the y-component of the displacement map in the luma plane after the x-component, and storing the z-component of displacement map in the luma plane after the y-component. At least a portion of the process 500 can be expressed as follows:

if(video format==4:4:4)
        x-component of displacement map is stored in Y plane
        y-component of displacement map is stored in Cb plane
        z-component of displacement map is stored in Cr plane
    else if(video format==4:2:0 OR video format==4:2:2 OR video format==4:0:0)
        x-component of displacement map is first stored in Luma plane
        y-component of displacement map is then stored in Luma plane after the x-component
        z-component of displacement map is then stored in Luma plane after the y-component
    end In this way, the displacement data can be efficiently and effectively stored in the video frame depending on the video format, and such that video formats other than 4:4:4 format can be used to increase compatibility for encoders and decoders.

Although FIGS. 5A and 5B illustrate an example packing arrangement process 500, various changes may be made to FIGS. 5A and 5B. For example, although the x, y, and z components are illustrated as being stored in certain planes of the video frame, the components could be stored in other ways without departing from the scope of this disclosure, such as storing one of the x, y, and z components in a different plane than shown (e.g., storing the components in the Cr plane or the Cb plane), storing the x, y, z components in a different order than that shown in FIG. 5B, or otherwise storing the components in other ways such as described in this disclosure.

Figure 6A:
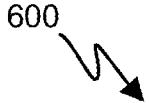
FIGS. 6A and 6B illustrate an example packing arrangement process based on a packing type variable in accordance with this disclosure.
Figure 6A:
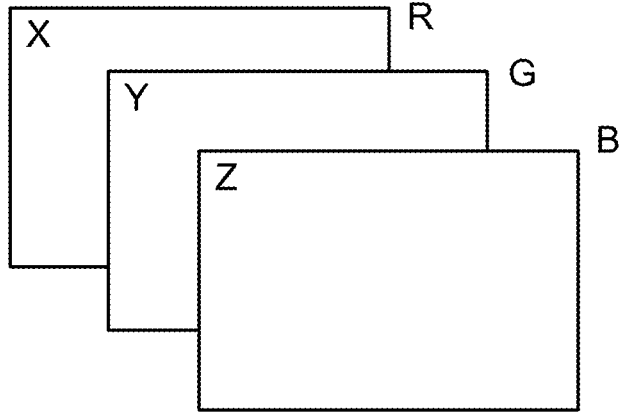
Figure 6B:
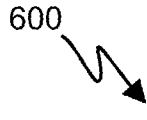
Figure 6B:
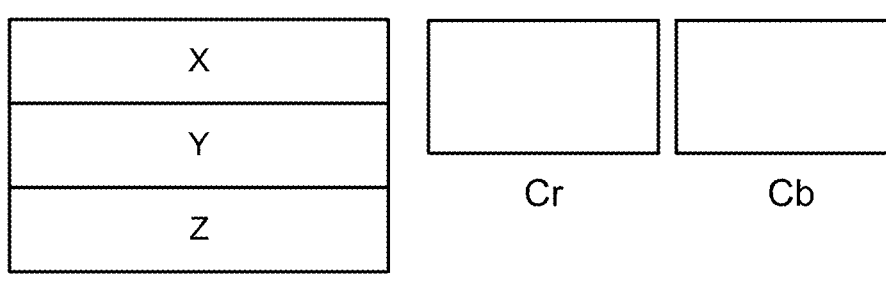

FIGS. 6A and 6B illustrate an example packing arrangement process 600 based on a packing type variable in accordance with this disclosure. The example packing arrangement process 600 illustrated in FIGS. 6A and 6B is for illustration only. For ease of explanation, the packing arrangement process 600 of FIGS. 6A and 6B may be described as being performed using the electronic device 300 of FIG. 3. However, the example packing arrangement process 600 may be used with any other suitable system and any other suitable electronic device, such as the server 200.

In various embodiments of this disclosure, the packing type of x, y, z displacement data in a video frame can be signaled in the bitstream or through external means. As shown in FIGS. 6A and 6B, the packing of the x, y, z, displacement data can depend on a syntax element or variable (e.g., "packing type") indicating how the displacement data is packed in a video frame. As shown in FIG. 6A, in this example, when the packing type indicates that separate planes are used to store the x, y, and z, components, the x-component of the displacement map is stored in the R plane, the y-component of the displacement map is stored in the G plane, and the z-component of the displacement map is stored in the B plane of a 4:4:4 video frame. It will be understood that the x, y, and z components could be stored in the luma, Cr, and Cb planes, respectively, if the YcrCb color space is used. In general, each video frame can have any suitable format, such as a red-green-blue (RGB) format, or a luma-chroma (YUV or YcrCb) format. Each video frame can also have any suitable resolution.

As shown in FIG. 6B, when the packing type indicates that the same plane is used to store the x, y, z components, then the x, y, z components are stored in the same plane of the video one after the other, such as a video format other than 4:4:4 format like the 4:2:0 format shown in FIG. 6B. In this example, the x-component of the displacement map is stored in the luma plane, the y-component of the displacement map is stored in luma plane after the x-component, and the z-component of displacement map is stored in luma plane after the y-component. At least a portion of the process 600 can be expressed as follows:

if(packing_type==SEPARATE_PLANES)
        x-component of displacement map is stored in R plane
        y-component of displacement map is stored in G plane
        z-component of displacement map is stored in B plane
    else if(packing_type==SAME_PLANE)
        x-component of displacement map is first stored in Luma plane
        y-component of displacement map is then stored in Luma plane after the x-component z-component of displacement map is then stored in
Luma plane after the y-component end In this way, the displacement data can be efficiently and effectively stored in the video frame depending on the packing type, and such that video formats other than 4:4:4 format can be used to increase compatibility for encoders and decoders.

Although FIGS. 6A and 6B illustrate an example packing arrangement process 600, various changes may be made to FIGS. 6A and 6B. For example, although the x, y, and z components are illustrated as being stored in certain planes of the video frame, the components could be stored in other ways without departing from the scope of this disclosure, such as storing one of the x, y, and z components in a different plane than shown (e.g., storing the components in the Cr plane or the Cb plane), storing the x, y, z components in a different order than that shown in FIG. 6B, or otherwise storing the components in other ways such as described in this disclosure. Also, while the example of FIG. 6B shows use of a 4:2:0 video frame, other video formats, such as 4:2:2, 4:0:0, etc., could be used.

Additionally, in various embodiments of this disclosure, the resolution of the x, y, z displacement data stored in a video frame is signaled in the bitstream or through external means. The resolution can be the actual height and width of each of the components or a syntax element that indicates the relative size to full resolution. For instance, let scale_x_h be the relative resolution along the vertical direction of the displacement data stored in a video frames. Let scale_x_w be the relative resolution along the horizontal direction, where $0<=scale\_x\_h<=1$. $0<=scale\_x\_w<=1$. When either of scale_x_h or scale_x_w is zero, the x displacement data is not stored in the video frame. Also, scale_y_h, scale_y_w, scale_z_h, scale_z_w are similar relative resolutions for y and z components, respectively. Some example uses of this include setting scale_x_h=1, scale_x_w=1, scale_y_h=0.5, scale_y_w=0.5, scale_z_h=0.5, scale_z_w=0.5, and setting packing_type=SEPARATE_PLANES to store the displacement data in a 4:2:0 video frame.

In various embodiments of this disclosure, a combination of one or more of video format (e.g., as described with respect to FIGS. 5A and 5B), packing type (e.g., as described with respect to FIGS. 6A and 6B), and scale factors (e.g., as described above) can be used to determine the packing mechanism of the displacement data in a video frame, as well as combinations of other factors as also described in this disclosure.

In some embodiments, the values of the scale factors (scale_x_h etc.) can be restricted to 0, 0.5, and 1.0. In some embodiments, a 3-symbol entropy code such as unary, exp-golomb, or arithmetic code, etc. can be used to signal each of the scale factors. In some embodiments, the scale factors corresponding to a coordinate (i.e., x, y, or z) can be jointly coded as shown in example Table 1:

TABLE 1

| Joint coding of scale factors | | |
| --- | --- | --- |
| Jointly coded scale factor | Scale factor in horizontal direction | Scale factor in vertical direction |
| 0 | 0 | 0 |
| 1 | 0.5 | 0.5 |
| 2 | 0.5 | 1 |
| 3 | 1 | 1 |

In some embodiments, a 4-symbol entropy code such as unary, exp-golomb, or arithmetic code, etc. can be used to signal the jointly coded scale factors. The scheme shown in Table 1 can be also generalized to other values of scale factors. The subsampling as indicated by the scale factors may be achieved using interpolation or discarding samples or any other method.

In some embodiments, a flag indicating whether y and z components (tangent and bi-tangent) are zeroed out can be signaled. In some embodiments, on the encoder side, the displacement data (x, y, and z (normal, tangent, and bi-tangent)) is stored in 4:2:0 format using the packing_type variable equal to SAME_PLANE such as shown in FIG. 6B. However, in some embodiments, the encoder may select to zero out the y and z (or tangent and bi-tangent) components of the displacement data. In such instances, no additional flag may be signaled to indicate the zeroing out of the y and z components of the displacement data. For example, in such embodiments, the normal_component_only_flag is not sent; only the packing-type variable is sent. If the packing type variable is set to SAME_PLANE, the x, y, and z components are packed into the 0th (Y) video component. The encoder may choose to zero out y and z components of displacement. In such embodiments, on the decoder side, the decoder assumes that all 3 displacement components (x, y, z) are present irrespective of the packing type. The packing type determines whether the displacement data is extracted from 0th component or all 3 components.

On the decoder side, in various embodiments, if the displacement data is received in 4:2:0 video format, the packing-type variable can be inferred to be SAME_PLANE. In this case, the x, y, and z components of the displacement data are extracted from the luma (or zeroth) component of the reconstructed displacement video based on the packing shown in FIG. 6B.

In various embodiments, if the decoder receives displacement video data in 4:4:4 video format, the x, y, and z components of the displacement data are extracted from the zeroth, first, and second component of the reconstructed displacement video. In various embodiments, if the decoder receives displacement video data in 4:0:0 video format, the x (or normal) component of the displacement data is extracted from the zeroth component of the reconstructed displacement video, and the y and z (or tangent and bi-tangent) components of displacement data are set to 0.

Figure 7:
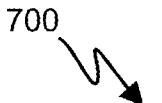
FIG. 7 illustrates an example interleaving packing arrangement process in accordance with this disclosure.

FIG. 7 illustrates an example interleaving packing arrangement process 700 in accordance with this disclosure. The example interleaving packing arrangement process 700 illustrated in FIG. 7 is for illustration only. For ease of explanation, the process 700 of FIG. 7 may be described as being performed using the electronic device 300 of FIG. 3. However, the process 700 may be used with any other suitable system and any other suitable electronic device, such as the server 200.

As shown in FIG. 7, in various embodiments, the electronic device 300 can interleave and store the x, y and z components of the displacement data in the same plane. The interleaving can be done at a pixel level or at a block level as shown in FIG. 7 for a 4:2:0 video frame, as one example. A flag (e.g., "interleaving flag") can be signaled in the bitstream or through external means to indicate whether the displacement data is interleaved and stored. When the interleaving flag is equal to a pre-determined constant (e.g., "INTERLEAVED"), then the x, y, z components of the displacement data in the video frame is pixel or block interleaved. The interleaving can also happen at a level of detail (LOD) boundary. When the interleaving flag is equal to a pre-determined value (e.g., "NO INTERLEAVING"), then the x, y, z data in the frame is not pixel or block interleaved. In this example, all of the x data is stored first, followed by all of the y data, followed by all of the z data, but the data could be interleaved in any other order.

Although FIG. 7 illustrates an example interleaving packing arrangement process 700, various changes may be made to FIG. 7. For example, although the x, y, and z components are illustrated as being stored in certain planes of the video frame, the components could be stored in other ways without departing from the scope of this disclosure, such as storing the x, y, and z components in a different plane than shown, storing the x, y, z components in a different order than that shown, or otherwise storing the components in other ways such as described in this disclosure. In some embodiments, two components could be interleaved in one plane while the other component is stored in a separate plane (e.g., storing the z-component values in the Cr and/or Cb plane and interleaving the x and y components in the luma plane). Also, while the example of FIG. 7 shows use of a 4:2:0 video frame, other video formats, such as 4:2:2, 4:0:0, etc., could be used.

Figure 8:
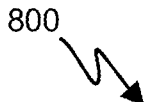
FIG. 8 illustrates an example full packing arrangement process in accordance with this disclosure.
Figure 8:
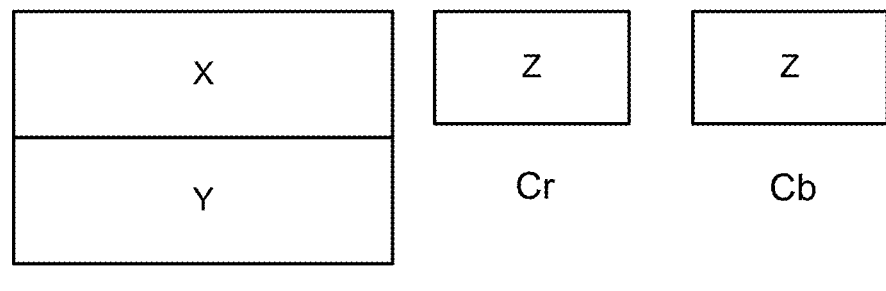

FIG. 8 illustrates an example full packing arrangement process 800 in accordance with this disclosure. The example full packing arrangement process 800 illustrated in FIG. 8 is for illustration only. For ease of explanation, the process 800 of FIG. 8 may be described as being performed using the electronic device 300 of FIG. 3. However, the process 800 may be used with any other suitable system and any other suitable electronic device, such as the server 200.

In various embodiments, to make optimum use of the space in a video frame, such as a 4:2:0 frame as shown in FIG. 8, the electronic device 300 can spread out and store the x, y, z components of the displacement data in all of the Luma, Cr and Cb planes in the video frames. In this example, 50% of the luma plane is occupied by the x-component, the remaining 50% of the luma plane is occupied by the y-component, and 50% of the z-component is stored in Cr plane and the remaining 50% of the z-component is stored in the Cb plane. In various embodiments, a packing type variable (e.g., "packing_type") can be used to indicate use of this packing type (e.g., "packing_type=FULL_420_PACKING").

Although FIG. 8 illustrates an example full packing arrangement process 800, various changes may be made to FIG. 8. For example, although the x, y, and z components are illustrated as being stored in certain planes of the video frame, the components could be stored in other ways without departing from the scope of this disclosure, such as storing the x, y, and z components in a different plane than shown, storing the x, y, z components in a different order than that shown, or otherwise storing the components in other ways such as described in this disclosure. In some embodiments, the x, y, z components can also be interleaved when using the full packing format described with respect to FIG. 8. The interleaving can be carried out at a pixel, block, or LOD level. Also, while the example of FIG. 8 shows use of a 4:2:0 video frame, other video formats, such as 4:2:2, 4:0:0, etc., could be used. In some embodiments, when the displacement data is coded as a single component, that is y and z components of the displacement data are zeroed out, packing_type=FULL_420_PACKING is interpreted to mean packing the 1D displacement data over Luma as well as Cr and Cb planes. Roughly ⅔rd of the single component displacement data is stored in Luma component, roughly ⅙th is stored in the Cr component and roughly ⅙th is stored in the Cb component.

In some embodiments, the components may be packed in different orders (e.g., x followed by y followed by z, or z followed by y followed by x, or y followed by z followed by x or other orders. In various embodiments, the components or blocks of the components be interleaved. Additionally, in some embodiments, the interleaving may be done based on LODs. For example, consider there are 3 LODs: LOD0, LOD1, and LOD2. In that case, using a reverse packing order specified, the x, y, and z components of LOD2 are interleaved. This is followed by LOD1, LOD0, and finally the padded rows (if any). Thus, the order of data in the displacement video frame would be x component of LOD2, y component of LOD2, z component of LOD2, x component of LOD1, y component of LOD1, z component of LOD1, x component of LOD0, y component of LOD0, z component of LOD0, and finally any padding blocks/rows.

Figure 9:
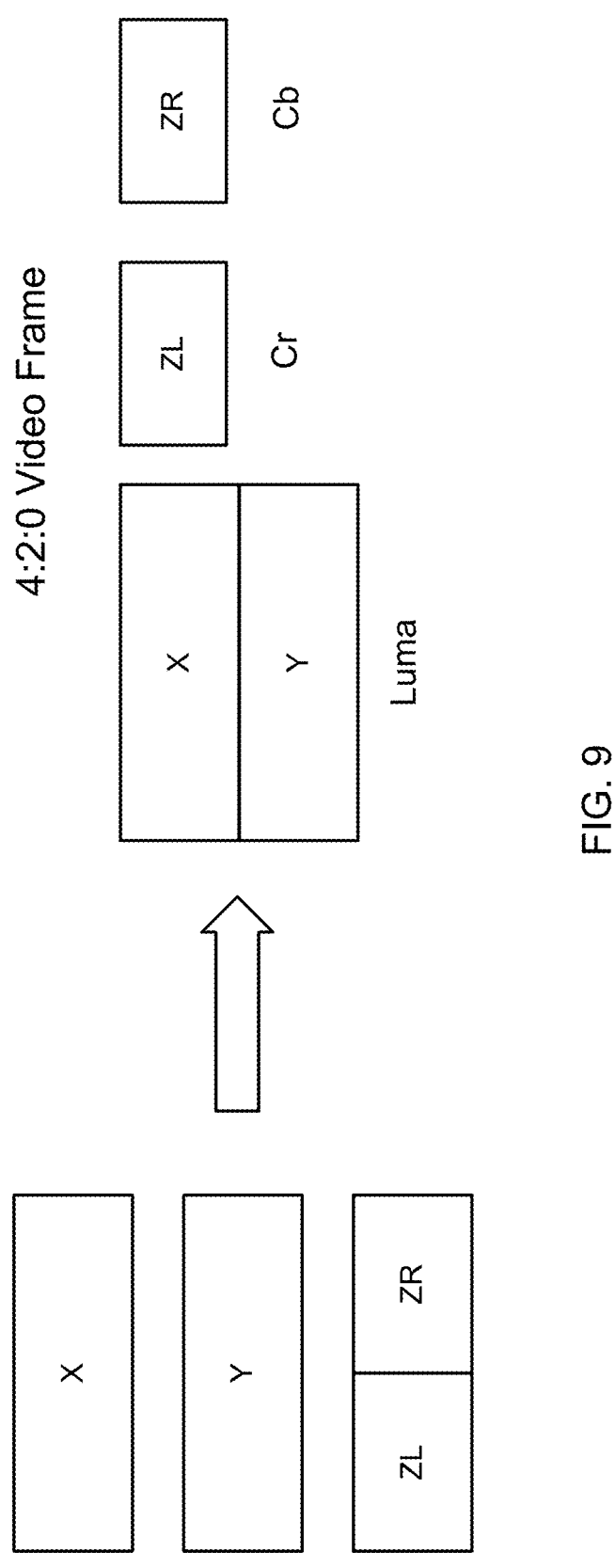
FIG. 9 illustrates an example split packing arrangement process in accordance with this disclosure.

FIG. 9 illustrates an example split packing arrangement process 900 in accordance with this disclosure. The example split packing arrangement process 900 illustrated in FIG. 9 is for illustration only. For ease of explanation, the process 900 of FIG. 9 may be described as being performed using the electronic device 300 of FIG. 3. However, the process 900 may be used with any other suitable system and any other suitable electronic device, such as the server 200.

As shown in FIG. 9, in various embodiments, the electronic device 300 can store half of the one of the x, y, z component values in a first plane and half of the values in a second plane. For example, in FIG. 9, half of the z-component values in a left half of the z-component plane (ZL) is stored in the Cr plane and half of the z-component values in a right half of the z-component plane (ZR) is stored in the Cb plane.

Although FIG. 9 illustrates an example split packing arrangement process 900, various changes may be made to FIG. 9. For example, although the x, y, and z components are illustrated as being stored in certain planes of the video frame, the components could be stored in other ways without departing from the scope of this disclosure, such as storing the x, y, and z components in a different plane than shown, storing the x, y, z components in a different order than that shown, or otherwise storing the components in other ways such as described in this disclosure. The interleaving can be carried out at a pixel, block, or LOD level. Also, while the example of FIG. 9 shows use of a 4:2:0 video frame, other video formats, such as 4:2:2, 4:0:0, etc., could be used. Additionally, in some embodiments, the x, y, z components can also be interleaved when using the split packing format described with respect to FIG. 9.

Figure 10:
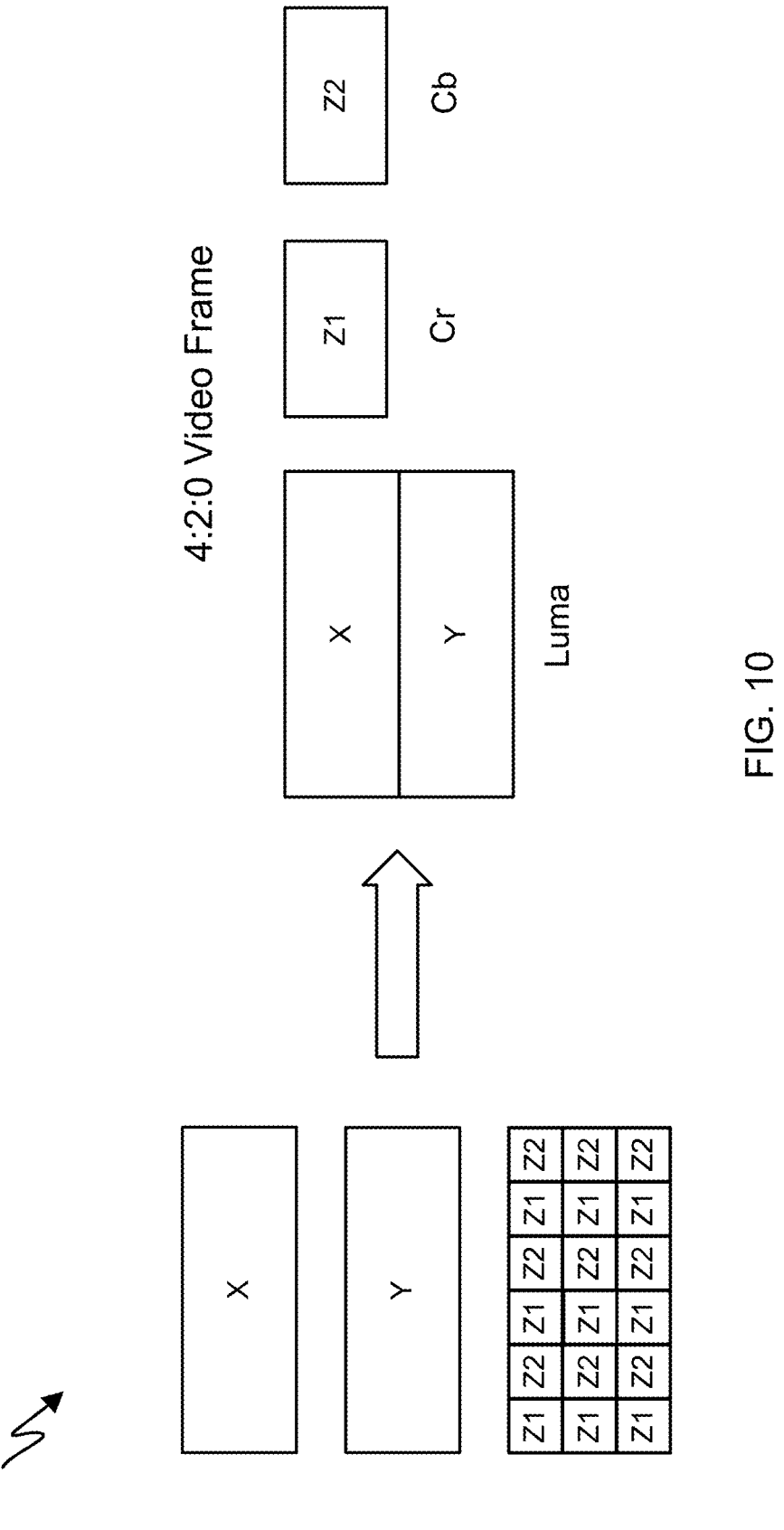
FIG. 10 illustrates an example split and interleaved packing arrangement process in accordance with this disclosure.

FIG. 10 illustrates an example split and interleaved packing arrangement process 1000 in accordance with this disclosure. The example split and interleaved packing arrangement process 1000 illustrated in FIG. 10 is for illustration only. For ease of explanation, the process 1000 of FIG. 10 may be described as being performed using the electronic device 300 of FIG. 3. However, the process 1000 may be used with any other suitable system and any other suitable electronic device, such as the server 200.

As shown in FIG. 10, in various embodiments, the electronic device 300 can store half of the one of the x, y, z component values in a first plane and half of the values in a second plane in an interleaved manner. In this example, the odd columns of z-component values (Z1) in the z plane are, in an interleaved manner, stored in the Cr plane and the even columns of z-component values (Z2) in the z plane are stored in the Cb plane, or vice versa.

Although FIG. 10 illustrates an example split and interleaved packing arrangement process 1000, various changes may be made to FIG. 10. For example, although the x, y, and z components are illustrated as being stored in certain planes of the video frame, the components could be stored in other ways without departing from the scope of this disclosure, such as storing the x, y, and z components in a different plane than shown, storing the x, y, z components in a different order than that shown, or otherwise storing the components in other ways such as described in this disclosure. The interleaving can be carried out at a pixel, block, or LOD level. Also, while the example of FIG. 10 shows use of a 4:2:0 video frame, other video formats, such as 4:2:2, 4:0:0, etc., could be used.

In various embodiments of this disclosure, the Cr and Cb planes can contain higher level of details of x, y, z components and the Luma plane can contain the lower level of details of x, y, z components or vice versa. Also, it will be understood that the x, y, z components of the displacement map can be interchangeably stored. It will also be understood that the x, y, and z components of the displacement data can be scanned in a Morton order or other scanning patterns before being stored in the video frames.

Figure 11A:
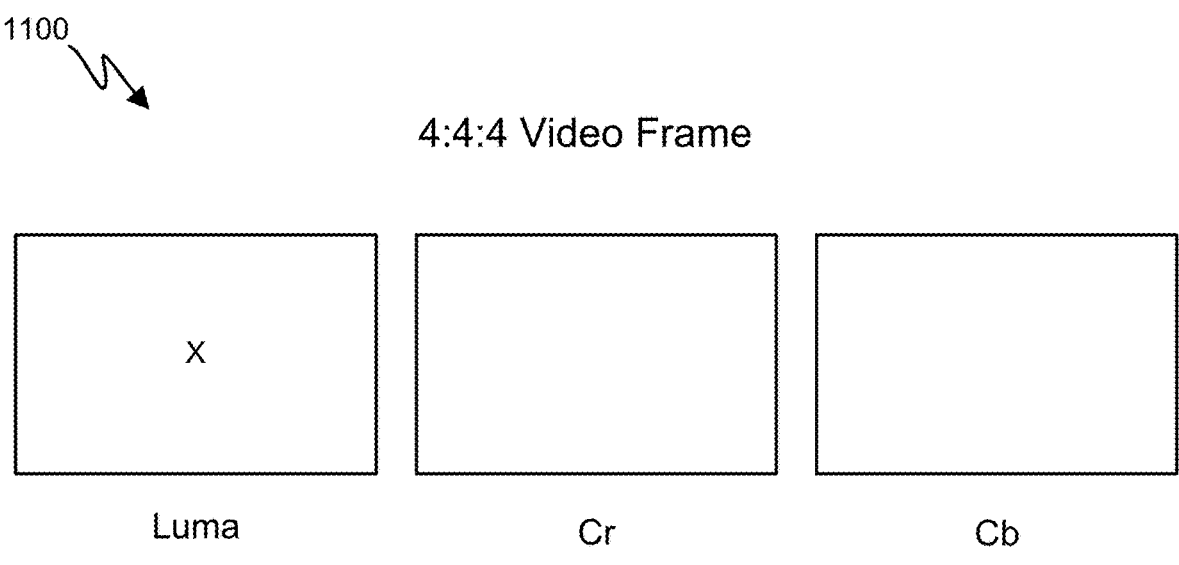
FIGS. 11A and 11B illustrate an example single component packing arrangement process based on video format in accordance with this disclosure.
Figure 11B:
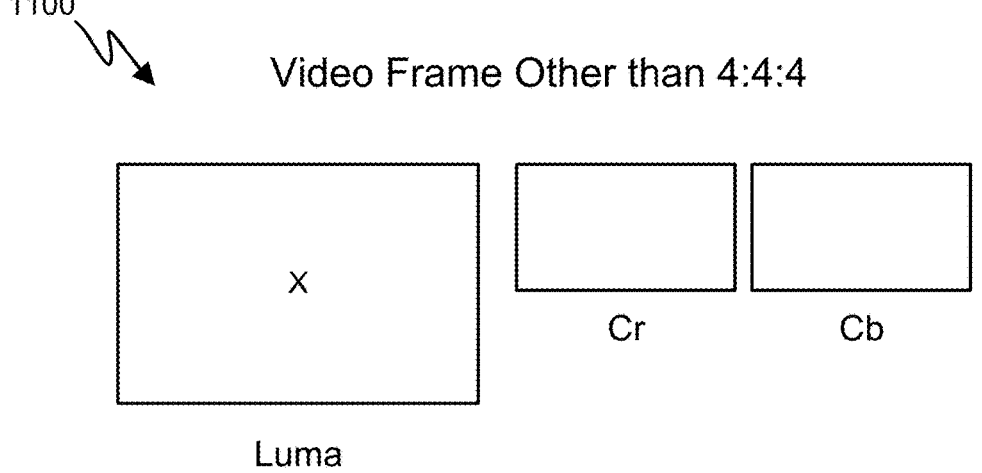

FIGS. 11A and 11B illustrate an example single component packing arrangement process 1100 based on video format in accordance with this disclosure. The single component packing arrangement process 1100 illustrated in FIGS. 11A and 11B is for illustration only. For ease of explanation, the process 1100 of FIGS. 11A and 11B may be described as being performed using the electronic device 300 of FIG. 3. However, the process 1100 may be used with any other suitable system and any other suitable electronic device, such as the server 200.

As also described with respect to FIG. 4, in various embodiments, a flag can be used and signaled to indicate whether only the first component of the displacement is coded. The first component may be the x-component (the displacements in the normal direction). For instance, the name of the flag can be "normal component only flag." For example, if the value of the flag is 1, and the displacement video is coded in 4:2:0 format, then the displacement video can be formed by including the first component of the displacement (x or normal direction) in the luma component and the chroma components can be set to a default value, such as illustrated in FIGS. 11A and 11B. In some embodiments, for an 8-bit video, the Cb and Cr components can be set to a value of 128 or 127. In other embodiments, for a 10-bit video, the Cb and Cr components can be set to a value of 512 or 511.

On the decoder side, when the value of the normal_component_only_flag is 1 and displacement video in 4:2:0 format is received, in some embodiments, only the luma component is decoded to derive the values of the displacement video in normal direction, such as shown in FIG. 11B. In other embodiments, all 3 components can be decoded but only the luma component is used to derive the values of the displacement video in the normal direction.

In some embodiments, if the value of the normal_component_only_flag is 0, and the displacement video is coded in 4:2:0 format, then the displacement video can be formed as described previously when packing_type=SAME_PLANE, and as also illustrated in FIG. 6B. Here, the chroma components may be assigned default values. On the decoder side, when the value of the flag is 0, and the displacement video is coded in 4:2:0 format, then the x, y, and z components of the displacement can be retrieved from the luma component of the 4:2:0 video based on the packing arrangement selected during encoding.

In some embodiments, the 4:2:0 video can always be formed according to the packing type variable being equal to "SAME PLANE," without the packing type being signaled in the bitstream. For example, if the "normal component only flag" is 1 and the video format is 4:2:0 (or 4:0:0 or 4:2:2 or 4:4:4), the $0^{th}$ (luma) component of the decoded video corresponds to the x component of displacement. In this scenario, using 4:2:0 format can be beneficial because sending data in the 4:2:2 or 4:4:4 format wastes bits since there is no data in Cb and Cr components. In some embodiments, 4:0:0 format can be used, and can provide more efficiency, depending on if hardware support exists for 4:0:0 format. If the "normal component only flag" is 0 and the video format is 4:2:0 (or 4:0:0 or 4:2:2), the 0th (luma) component of the decoded video can contain x, y, and z components of the displacement (x, followed by y, followed by z). In some embodiments, if the video format is 4:4:4 and "normal component only flag" is 0, x, y, z components of displacement are extracted form YcbCr (or RGB) components respectively.

In some embodiments, bitstream conformance constraints can be imposed such that 4:4:4 format can be used only when all 3 components of displacement are present. Similarly, in some embodiments, bitstream conformance constraints can be imposed such that 4:0:0 format can be used only when only one component of displacement is present. However, all 3 components could still be packed into a 4:0:0 frame. In some embodiments, it is a condition of bitstream conformance that when the packing type is SEPARATE_PLANES, the video format is 4:4:4.

In some embodiments, the 4:2:0 video can always be formed according to the packing type variable being equal to "FULL 420 PACKING," without the packing type being signaled in the bitstream. In some embodiments, the packing_type can be explicitly signaled in the bitstream when the value of the normal_component_only_flag is 0.

In some embodiments, the packing_type is explicitly signaled in the bitstream and also includes a new packing type denoted by, for example, "SUBSAMPLED_PACKING." In some embodiments, when the packing type is set as SUBSAMPLED_PACKING, the scale factors for Y, Cr, Cb, or, correspondingly, the x, y, and z components, are as follows:

scale_x_h=1.0, scale_x_v=1.0
scale_y_h=0.5, scale_y_v=0.5
scale_z_h=0.5, scale_z_v=0.5.

Here, the subsampling for the y and z components may be achieved using interpolation, discarding 3 out of 4 samples, or any other method. In some embodiments, the 4:2:0 video can always be formed according to the packing type being equal to SUBSAMPLED_PACKING, without the packing type being signaled in the bitstream.

In some embodiments, if the value of the flag is 0, and the displacement video is coded in 4:2:0 format, then the displacement video can be formed as described previously when the packing_type=FULL_420_PACKING, such as illustrated in FIG. 8. If the value of the flag is 0, however, then the chroma components may be assigned default values.

In some embodiments, if a decoder receives displacement video in 4:4:4 format, the decoder can infer that the normal_component_only_flag is 0 (irrespective of the actual value signaled in the bitstream) and proceed to extract the x, y, and z components of displacement from the zeroth, first and second component of the displacement video in 4:4:4 format. In this example, the signaled value of normal_component_only_flag is ignored.

In some embodiments, if a decoder receives displacement video in 4:4:4 format, and the normal_component_only_flag is 0, the decoder extracts x, y, and z components of displacement from the zeroth, first and second component of the displacement video in 4:4:4 format. In some embodiments, if a decoder receives displacement video in 4:4:4 format, and the normal_component_only_flag is 1, the decoder extracts the x (normal) component of displacement from the zeroth component of the displacement video in 4:4:4 format, such as illustrated in FIG. 11A.

In some embodiments, if a decoder receives displacement video in 4:0:0 format, the decoder can infer that the normal_component_only_flag is 1 (irrespective of the actual value signaled in the bitstream) and proceed to extract the x (normal) component of displacement from the displacement video in 4:0:0 format. In some embodiments, it can be a requirement of bitstream conformance that, when a decoder receives 4:0:0 format displacements video, the flag indicating the single displacement component shall be equal to 1. In some embodiments, it can be a requirement of bitstream conformance that, when a decoder receives 4:4:4 format displacements video, the flag indicating single displacement component shall be equal to 0.

Although FIGS. 11A and 11B illustrate an example single component packing arrangement process 1100, various changes may be made to FIGS. 11A and 11B. For example, although the x, y, and z components are illustrated as being stored in certain planes of the video frame, the components could be stored in other ways without departing from the scope of this disclosure.

Figure 12:
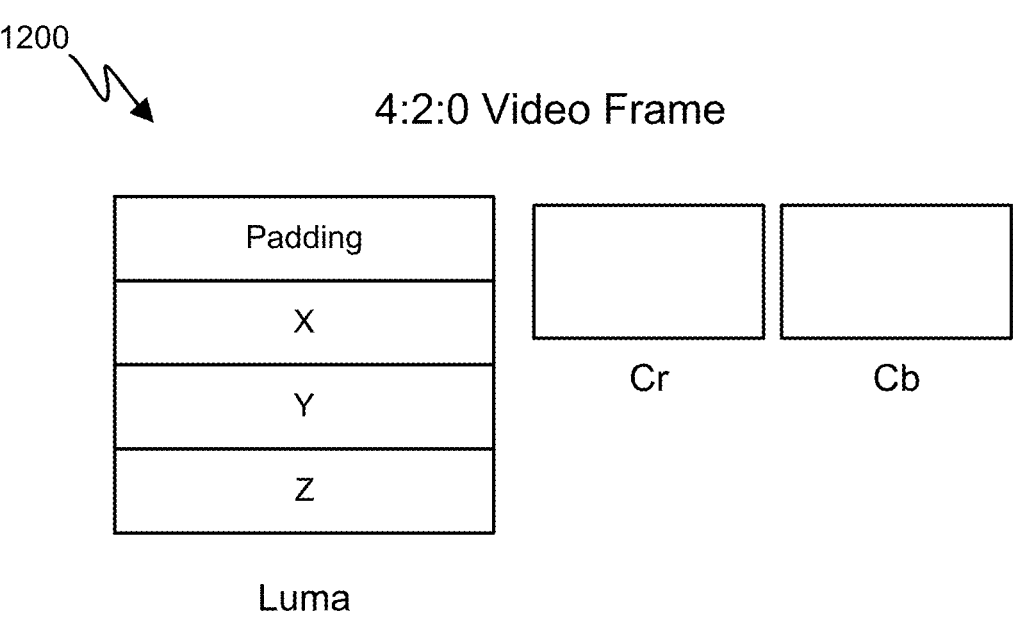
FIGS. 12 through 15 illustrate additional example packing arrangements utilizing padding in accordance with this disclosure.
Figure 13:
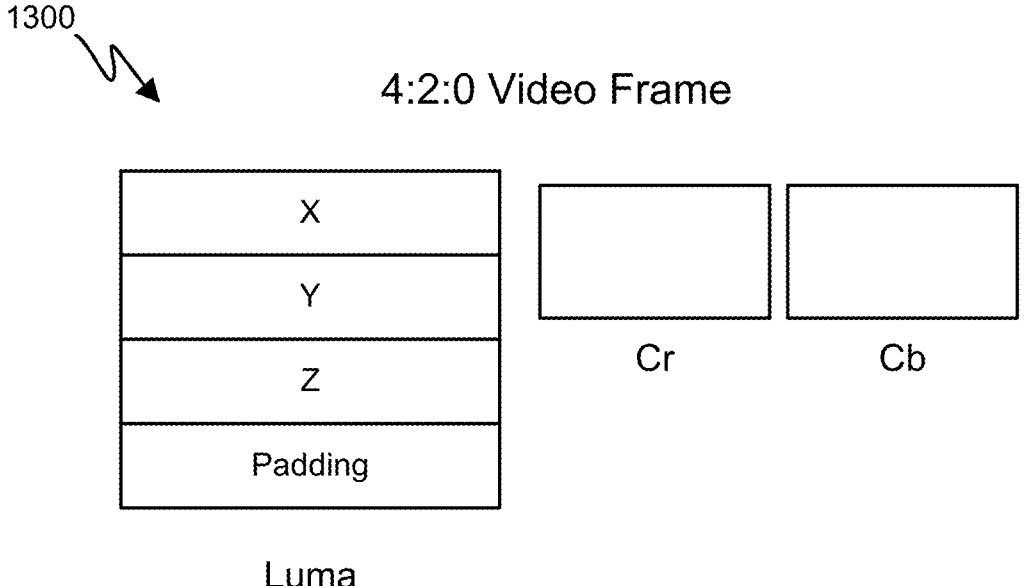

FIGS. 12 through 15 illustrate additional example packing arrangements utilizing padding in accordance with this disclosure. In various embodiments, the size of the displacement frames may change temporally due to different numbers of vertices. In such cases, the width of displacement video can be kept fixed and the number of rows may be padded to make the height of the displacement video constant. For example, in some embodiments, the padded rows can be placed at the top of the frame, followed by the x, y, and z components, when the packing type is equal to "SAME PLANE," such as shown in FIG. 12. In some embodiments, the padded rows can be placed at the bottom of the frame, after the x, y, and z components, when the packing type is equal to "SAME_PLANE," such as shown in FIG. 13.

Figure 14:
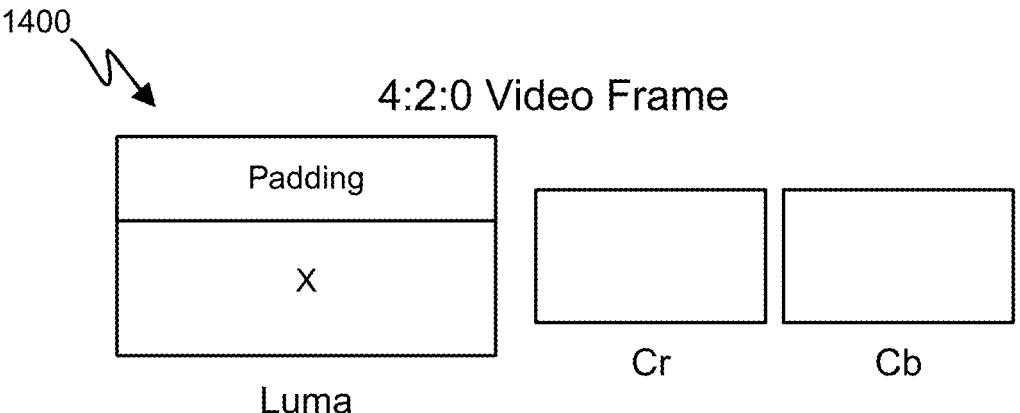
Figure 15:
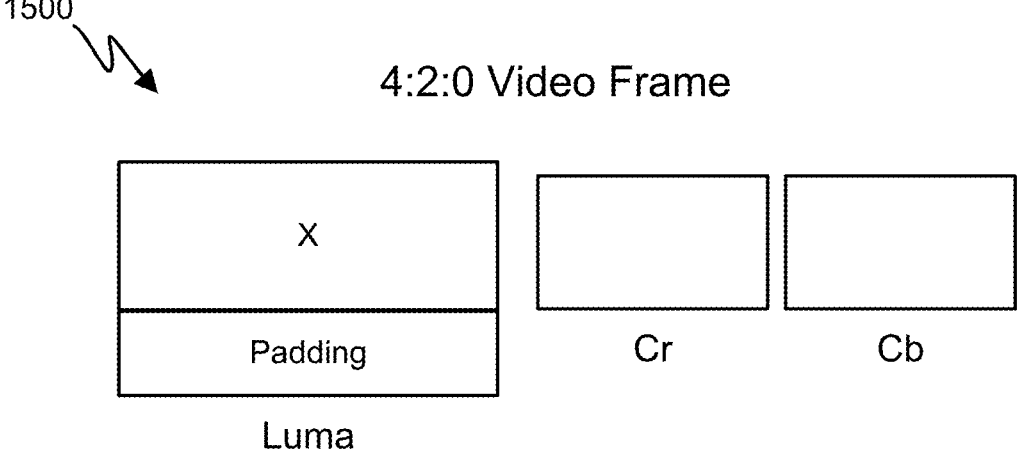

In some embodiments, when the normal_component_only_flag is equal to 1, the zeroth component of a 4:2:0 video frame may contain padded rows at the top followed by the x component, such as shown in FIG. 14. In some embodiments, the padded rows may be placed at the bottom of the zeroth component after the x component, such as shown in FIG. 15.

Although FIGS. 12 through 15 illustrate example packing arrangements utilizing padding, various changes may be made to FIGS. 12 through 15. For example, although the x-component is illustrated as being stored in the luma plane of the video frame, the component could be stored in another plane without departing from the scope of this disclosure. Also, while the examples of FIGS. 12 through 15 show use of a 4:2:0 video frame, other video formats such as 4:2:2, 4:0:0, etc., could be used.

Various standards have been proposed with respect to vertex mesh (V-MESH) and dynamic mesh coding. The following documents are hereby incorporated by reference in their entirety as if fully set forth herein:

"V-Mesh Test Model v1," ISO/IEC SC29 WG07 N00404, July 2022

"WD 2.0 of V-DMC", ISO/IEC SC29 WG07 N00546, January 2023

"WD 3.0 of V-DMC", ISO/IEC SC29 WG07 N00611, April 2023

"WD 4.0 of V-DMC," ISO/IEC JTC 1/SC 29/WG 07 N00611, August 2023

To provide the packing arrangements of the various embodiments of this disclosure, WD 2.0 of V-DMC can be updated to specify the following:

8.3.6.1.3 Atlas Sequence Parameter Set Extension RBSP Syntax

| | Descriptor |
|---|---|
| asps_vmc_extension( ) { | |
| ... | |
| asps_vmc_ext_direct_attribute_projection_enabled_flag[ i ] | u(1) |
| } | |
| asps_vmc_ext_packing_method | u(1) |
| asps_vmc_ext_1D_displacement_flag | u(1) |
| } | |

8.4.6.1.3 Atlas Sequence Parameter Set Extension RBSP Syntax

. . .

asps_vmc_ext_packing_method equal to 0 specifies that the displacement component samples are packed in ascending order, asps_vmc_ext_packing_method equal to 1 specifies that the displacement component samples are packed in descending order.

Asps_vmc_ext_1D_displacement_flag equal to 1 specifies that only the normal (or x) component of the displacement is present in the compressed geometry video. The remaining two components are inferred to be 0. Asps_vmc_ext_1D_displacement_flag equal to 0 specifies that all 3 components of the displacement are present in the compressed geometry video.

11.5 Inverse Image Packing of Wavelet Coefficients

Inputs to this process are:

width, which is a variable indicating the width of the displacements video frame, height, which is a variable indicating the height of the displacements video frame, bitDepth, which is a variable indicating the bit depth of the displacements video frame, dispQuantCoeffFrame, which is a 3D array of size width×height×3 indicating the packed quantized displacement wavelet coefficients.

blockSize, which is a variable indicating the size of the displacements coefficients blocks, positionCount, which is a variable indicating the number of positions in the subdivided submesh.

The output of this process is dispQuantCoeffArray, which is a 2D array of size positionCount×3 indicating the quantized displacement wavelet coefficients.

It is a requirement of bitstream conformance that when DecGeoChromaFormat is equal to 4:0:0, asps_vmc_ext_1D_displacement_flag shall be equal to 1. It is also a requirement of bitstream conformance that when DecGeoChromaFormat is equal to 4:4:4, asps_vmc_ext_1D_displacement_flag shall be equal to 0.

The 2D array dispQuantCoeffArray is initialized to 0. The variable DisplacementDim is set as follows:

If asps_vmc_ext_1D_displacement_flag is equal to 1, DisplacementDim is set to 1

Otherwise (asps_vmc_ext_1D_displacement_flag is equal to 0) DisplacementDim is set to 3

Let the function extracOddBits(x) be defined as follows:

```
x = extracOddBits( x ) {
    x = x & 0x55555555
    x = (x | (x >> 1)) & 0x33333333
    x = (x | (x >> 2)) & 0x0F0F0F0F
    x = (x | (x >> 4)) & 0x00FF00FF
    x = (x | (x >> 8)) & 0x0000FFFF
}
```

Let the function computeMorton2D(i) be defined as follows:

```
(x, y) = computeMorton2D( i ) {
    x = extracOddBits( i >> 1 )
    y = extracOddBits( i )
}
```

The wavelet coefficients inverse packing process proceeds as follows:

```
pixelsPerBlock = blockSize * blockSize
widthInBlocks = width / blockSize
shift = (1 << bitDepth) >> 1
blockCount = (positionCount + pixelsPerBlock - 1) / pixelsPerBlock
heightInBlocks = (blockCount + widthInBlocks - 1) / widthInBlocks
origHeight = heightInBlocks * blockSize
paddedHeight = height - 3 * origHeight
if (!asps_vmc_ext_1D_displacement_flag)
    start = (paddedHeight + origHeight) * width - 1;
else
    start = (width * height) - 1;
for( v = 0; v < positionCount; v++ ) {
    v0 = asps_vmc_ext_packing_method ? start - v : v;
    blockIndex = v0 / pixelsPerBlock
    index WithinBlock = v0 % pixelsPerBlock
    x0 = (blockIndex % widthInBlocks) * blockSize
    y0 = (blockIndex / widthInBlocks) * blockSize
    ( x, y ) = computeMorton2D(index WithinBlock)
    x1 = x0 + x
    y1 = y0 + y
    for( d = 0; d < DisplacementDim; d++ )
        if (DecGeoChromaFormat == 4:2:0)
            dispQuantCoeffArray[ v ][ d ] =
                dispQuantCoeffFrame[ x1 ][ d * origHeight +
    y1 ][ 0 ] - shift
        else
            dispQuantCoeffArray[ v ][ d ] =
                dispQuantCoeffFrame[ x1 ][ y1 ][ d ] - shift
}
```

Figure 16:
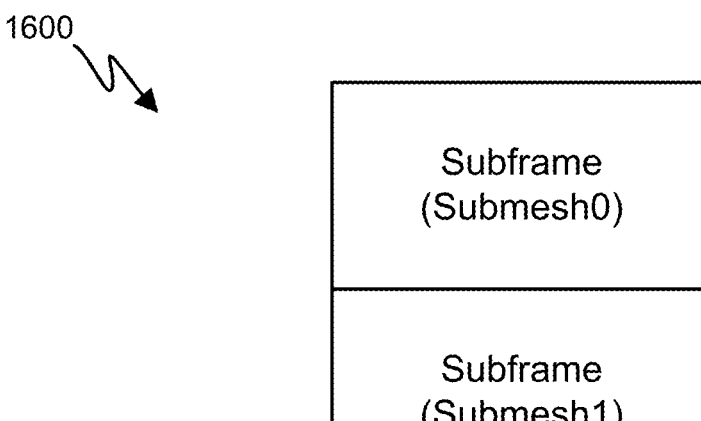
FIGS. 16 through 20 illustrate examples of submesh packing arrangements in accordance with this disclosure.

FIGS. 16 through 20 illustrate examples of submesh packing arrangements in accordance with this disclosure. In various embodiments, the original mesh may be divided into several submeshes. For each submesh, an encoder may derive a corresponding base submesh. The multiple base submeshes may be encoded and decoded in parallel by the base mesh codec. The 3-D displacement vectors in displacement fields corresponding to different submeshes occupy non-overlapping rectangular regions in the displacement video frame. An example arrangement 1600 of two submeshes where the rectangular regions are arranged in a vertical grid is shown in FIG. 16.

In some embodiments, each rectangular region of a displacement frame corresponding to a submesh can be treated as a subframe. All the packing embodiments described above in this disclosure may be applied to each subframe. In some embodiments, the same packing method can be used for all the submeshes in a mesh frame.

Figure 17:
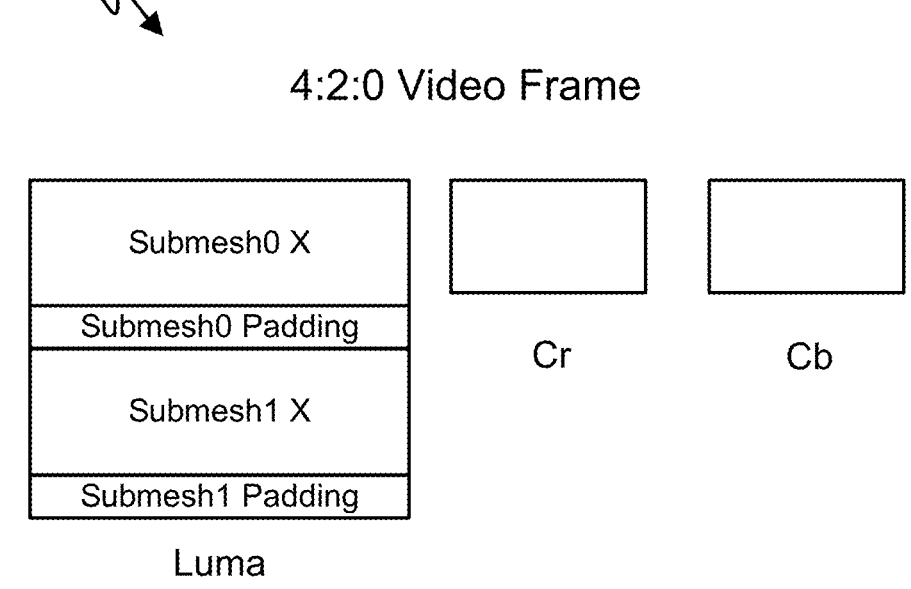

For example, if a flag indicates that only the first component of the displacement is coded, and there are two submeshes, the data can be arranged as shown in FIG. 17. In this example arrangement 1700, the luminance (Y) component of the displacement video frame includes the x (or normal) component of submesh 0, followed by any padding to make the subframes of submesh 0 to be of equal size. This padding is followed by the x (normal) component of submesh 1, and finally any padding for submesh 1. The displacement video may be coded as monochrome video (4:0:0 format) or in 4:2:0 format for example. In this case, the Cb and Cr components of the displacement video frame take default values. It will be understood that this embodiment can be extended to multiple submeshes. In some embodiments, subframes of submeshes can be horizontally stacked or stacked in a rectangular grid structure. The advantage of calculating the padding for each submesh separately and including it right after the corresponding submesh data is that the position of submesh displacement data remains constant for all the frames. This makes it easier to tile the displacement data for different submeshes and perform partial decoding.

Figure 18:
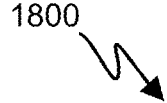

If a flag indicates that all three components of the displacement are coded, and there are two submeshes, the data can be arranged as shown in FIG. 18. When the displacement video is coded in 4:2:0 format, the Cb and Cr components of the displacement video frame can take default values. In this example arrangement 1800, the luminance (Y) component of the displacement video frame includes the x, y, and z (or normal, tangent, and bi-tangent) components of submesh 0, followed by any padding for submesh 0. This padding is followed by the x, y, and z (or normal, tangent, and bi-tangent) components of submesh 1 and any padding. It will be understood that this embodiment can be extended to multiple submeshes. It can also be extended to the case where subframes of submeshes can be horizontally stacked or stacked in a rectangular grid structure.

Figure 19:
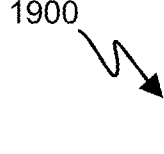

In some embodiments, the padding for all the submeshes can included at the bottom of the frame as shown in the example arrangement 1900 of FIG. 19. In such embodiments, the width of each displacement frame is fixed. Then, for each frame, the height of subframe corresponding to each submesh is calculated. The sum of the subframe heights is the height of the displacement frame. Then, the maximum height over all the frames is calculated and padding is added at the bottom of each frame (if needed) to make the height of each frame equal to the maximum height. In this example, the position of the displacement data corresponding to each submesh may change from one frame to another. However, in some cases less padding is needed. It will be understood that this packing arrangement can be extended to multiple submeshes. It can also be extended to the case where subframes of submeshes can be horizontally stacked or stacked in a rectangular grid structure.

Figure 20:
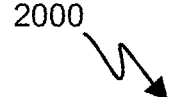

In some embodiments, as illustrated in the example arrangement 2000 of FIG. 20, the x (or normal) components for all the submeshes can be packed together followed by the y (or tangent) components, followed by the z (or bi-tangent) components, and any padding. For such a configuration, bitstream syntax can be used to signal three rectangles (corresponding to the position of the x, y, and z component in the video frame) for each submesh. Alternatively, only the rectangle corresponding to the x-component of a submesh may be signaled and the position of the other two components for that submesh may be inferred.

Although FIGS. 16 through 20 illustrate example submesh packing arrangements, various changes may be made to FIGS. 16 through 20. For example, although the sub-meshes are illustrated as being stored in the luma plane of the video frame, the submeshes could be stored in another plane without departing from the scope of this disclosure. Also, while the examples of FIGS. 16 through 20 show use of a 4:2:0 video frame, other video formats, such as 4:2:2, 4:0:0, etc., could be used.

Figure 21:
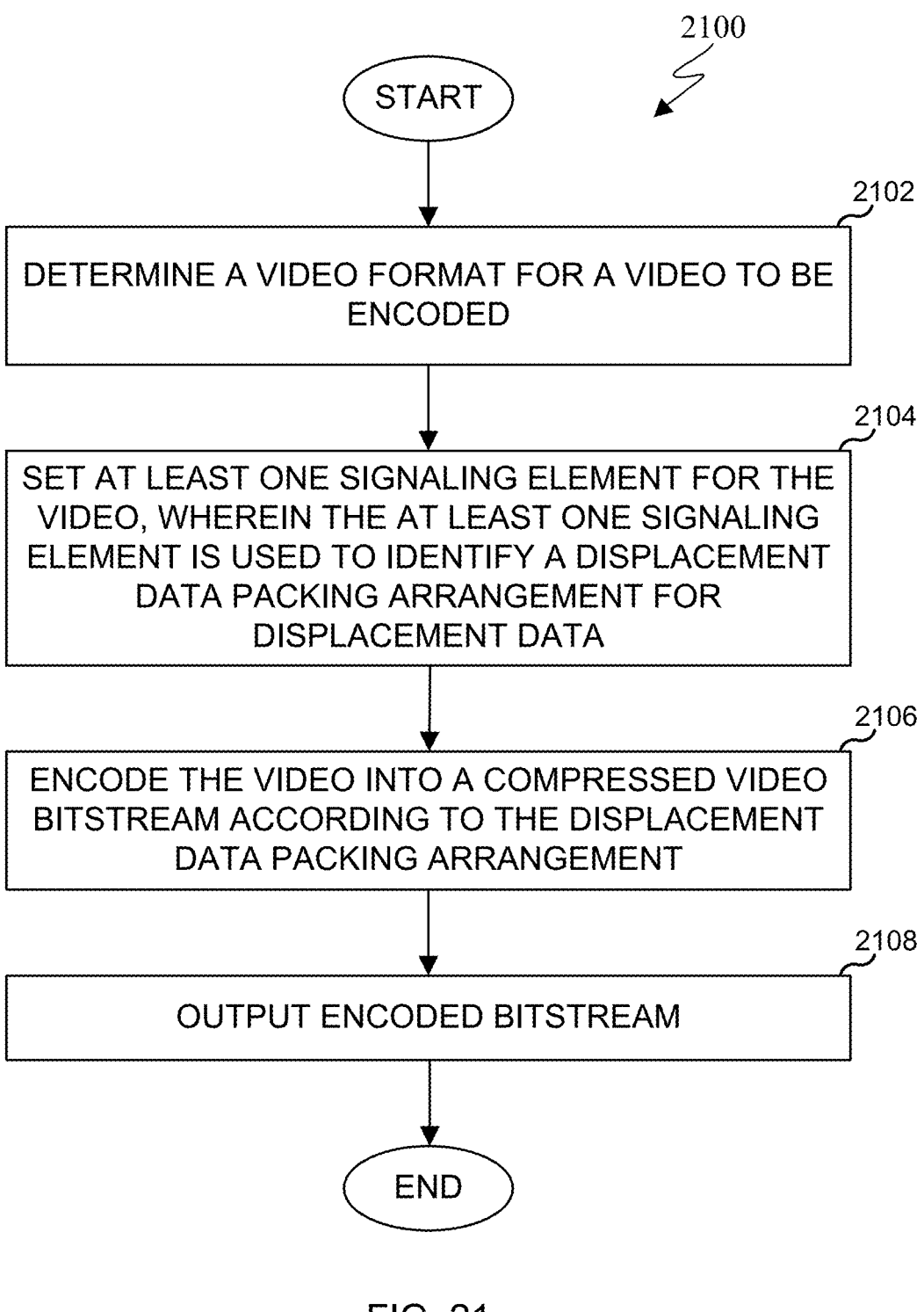
FIG. 21 illustrates an example encoding method for improved packing of displacements data in video frames in accordance with this disclosure.

FIG. 21 illustrates an example encoding method 2100 for improved packing of displacements data in video frames in accordance with this disclosure. For ease of explanation, the method 2100 of FIG. 21 is described as being performed using the electronic device 300 of FIG. 3. However, the method 2100 may be used with any other suitable system and any other suitable electronic device.

As shown in FIG. 21, at step 2102, the electronic device 300 determines a video format for a video to be encoded, such as whether the video format is 4:4:4, 4:2:0, 4:2:2, 4:0:0, etc. At step 2104, the electronic device 300 sets at least one signaling element for the video. In some embodiments, the at least one signaling element is used to identify a displacement data packing arrangement for displacement data. For example, as described in this disclosure, the at least one signaling element could be a format variable indicating the specific video format used, or could be a variable indicating a packing type (e.g., "packing type") for the displacement data, which in either case can alter the displacement data packing arrangement used during encoding. For instance, when the video format is 4:4:4, the x, y, and z components can be packed into the zeroth, first, and second component of the video frame, respectively, or, when the video is 4:2:0, the x, y, and z components can all be packed in the zeroth component of the video frame, such as if the packing type variable indicates the displacement data is within a same plane. As described in this disclosure, the zeroth component of a displacement video frame can be a luma component of the displacement video frame.

At step 2106, the electronic device 300 encodes the video into a compressed video bitstream according to the displacement data packing arrangement. In some embodiments, as described in this disclosure, encoding the video into the compressed video bitstream includes interleaving the normal, tangent, and bi-tangent components in the zeroth component of the displacement video frame. In various embodiments, the at least one signaling element can include a flag, and the electronic device 300 can set a value of the flag, for example, in a sequence parameter set, the flag indicating whether only a normal component of the displacement data is present in the compressed video bitstream or whether normal, tangent, and bi-tangent components of the displacement data are present in the compressed video bitstream. For example, when the value of the flag indicates only the normal component of the displacement data is present in the compressed video bitstream, the electronic device 300 can encode the displacement data in only a zeroth component of each displacement video frame. As another example, when the value of the flag indicates the normal, tangent, and bi-tangent components of the displacement data are present in the compressed video bitstream, the electronic device 300 can, for each displacement video frame and based on the video format used, encode the displacement data in the zeroth component only (e.g., storing the x, y, and z components in the zeroth component), or encode the displacement data in the zeroth, first, and second components (e.g, storing the x component in the zeroth component, the y component in the first component, and the z component in the second component). In some embodiments, the value of the flag is set to 1 when the video format is a 4:0:0 format and the value of the flag is set to 0 when the video format is a 4:4:4 format.

At step 2108, the electronic device 300 outputs a bitstream including the encoded data. This output bitstream can include the compressed displacement bitstream shown for example in FIG. 4, and/or can be the compressed bitstream that includes the compressed displacements bitstream, as well as the compressed base mesh bitstream, and the compressed attribute bitstream, as also shown for example in FIG. 4. The output bitstream can be transmitted to an external device or to a storage on the electronic device 300.

Although FIG. 21 illustrates one example of an encoding method 2100 for improved packing of displacements data in video frames, various changes may be made to FIG. 21. For example, while shown as a series of steps, various steps in FIG. 21 may overlap, occur in parallel, or occur any number of times.

Figure 22:
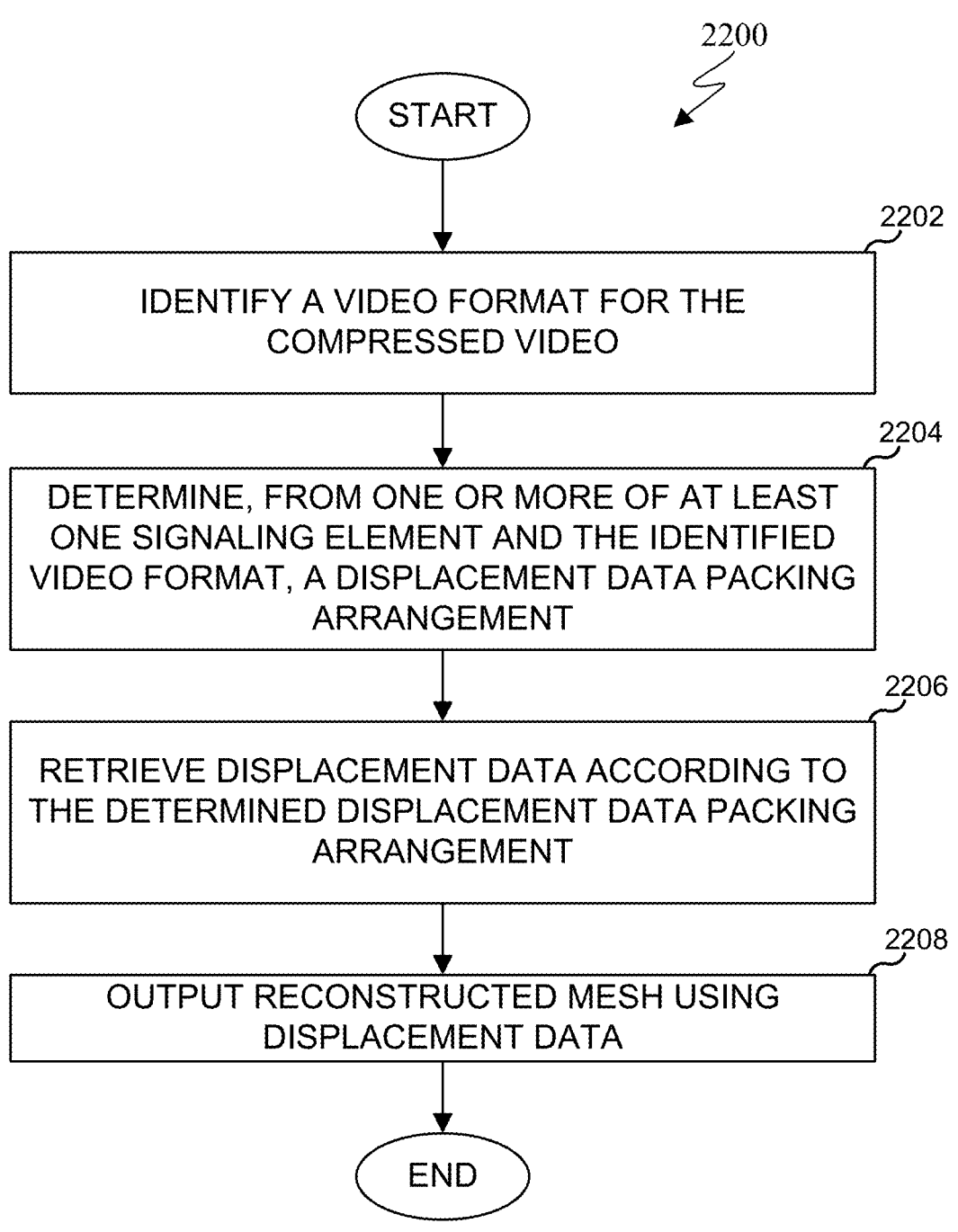
FIG. 22 illustrates an example decoding method for improved packing of displacements data in video frames in accordance with this disclosure.

FIG. 22 illustrates an example decoding method 2200 for improved packing of displacements data in video frames in accordance with this disclosure. For ease of explanation, the method 2200 of FIG. 22 is described as being performed using the electronic device 300 of FIG. 3. However, the method 2200 may be used with any other suitable system and any other suitable electronic device.

As shown in FIG. 22, at step 2202, the electronic device 300 identifies a video format for a compressed video. At step 2204, the electronic device 300 determines, from one or more of at least one signaling element and the identified video format, a displacement data packing arrangement for the compressed video. For example, as described in this disclosure, the at least one signaling element could be a format variable indicating the specific video format used, or could be a variable indicating a packing type for the displacement data (e.g., "packing type"), which in either case can alter the displacement data packing arrangement of displacement data in the compressed video. For instance, when the video format is 4:4:4, the x, y, and z components can be packed into the a zeroth, first, and second component of the video frame, respectively, or, when the video is 4:2:0, the x, y, and z components can all be packed in the zeroth component of the video frame, such as if the packing type variable indicates the displacement data is within a same plane. As described in this disclosure, the zeroth component of a displacement video frame can be a luma component of the displacement video frame. In some embodiments, the packing arrangement can also be determined from the video format used.

Determining the displacement data packing arrangement informs the electronic device 300 as to how to unpack or extract the displacement data from the video frame. At step 2206, the electronic device 300 retrieves displacement data according to the determined displacement data packing arrangement. In some embodiments, the normal, tangent, and bi-tangent components can also be interleaved in the zeroth component of the displacement video frame and the electronic device 300 can extract the interleaved values. In some embodiments, the at least one signaling element can include a flag, and the electronic device 300 can determine, based on a value of the flag, for example in a sequence parameter set, whether only a normal component of the displacement data is present in the bitstream for the compressed video or whether normal, tangent, and bi-tangent components of the displacement data are present in the bitstream for the compressed video. In some embodiments, when only the normal component of the displacement data is present in the bitstream for the compressed video, the electronic device 300 retrieves the displacement data from only a zeroth component of each displacement video frame. In some embodiments, when normal, tangent, and bi-tangent components of the displacement data are present in the bitstream for the compressed video, the electronic device 300, for each displacement video frame, can retrieve the displacement data from the zeroth component (e.g., retrieving the x, y, and z components from the zeroth component), or can retrieve the displacement data from the zeroth, first, and second components of each displacement video frame (e.g., the x component from the zeroth component, the y component from the first component, and the z component from the second component), based on the video format used. In some embodiments, the value of the flag is inferred to be 1 when the video format is a 4:0:0 format and the value of the flag is inferred to be 0 when the video format is a 4:4:4 format. In some embodiments, the video frames include padded regions, where the padded regions are devoid of displacement data, and the displacement data is retrieved from regions of each displacement video frame that are not padded.

At step 2208, the electronic device 300 outputs a reconstructed mesh based on the displacement data. The output reconstructed mesh-frame can be transmitted to an external device or to a storage on the electronic device 300.

Although FIG. 22 illustrates one example of a decoding method 2200 for improved packing of displacements data in video frames, various changes may be made to FIG. 22. For example, while shown as a series of steps, various steps in FIG. 22 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a communication interface configured to receive a bitstream for a compressed video; and
a processor operably coupled to the communication interface, the processor configured to:
identify a video format for the compressed video;
determine, from one or more of at least one signaling element and the identified video format, a displacement data packing arrangement; and
retrieve displacement data according to the determined displacement data packing arrangement,
wherein the at least one signaling element includes a flag associated with the displacement data packing arrangement, and
wherein a value of the flag is inferred based on the identified video format for the compressed video.

2. The apparatus of claim 1, wherein the at least one signaling element includes a packing type variable.

3. The apparatus of claim 2, wherein, when the packing type variable indicates the displacement data is within a same plane, the displacement data packing arrangement includes that normal, tangent, and bi-tangent components of the displacement data are stored in a zeroth component of a displacement video frame.

4. The apparatus of claim 3, wherein the normal, tangent, and bi-tangent components are interleaved in the zeroth component of the displacement video frame.

5. The apparatus of claim 3, wherein the zeroth component of the displacement video frame is a luma component of the displacement video frame.

6. The apparatus of claim 1, wherein the processor is further configured to:
determine, based on the value of the flag, whether only a normal component of the displacement data is present in the bitstream for the compressed video or whether normal, tangent, and bi-tangent components of the displacement data are present in the bitstream for the compressed video;
when only the normal component of the displacement data is present in the bitstream for the compressed video, retrieve the displacement data from only a zeroth component of each displacement video frame; and
when normal, tangent, and bi-tangent components of the displacement data are present in the bitstream for the compressed video, for each displacement video frame, retrieve, based on the identified video format, the displacement data from one of:
the zeroth component; or
the zeroth, first, and second components.

7. The apparatus of claim 6, wherein:
the value of the flag is inferred to be 1 when the video format is a 4:0:0 format; or
the value of the flag is inferred to be 0 when the video format is a 4:4:4 format.

8. A method comprising:
identifying a video format for a compressed video of a received bitstream;
determining, from one or more of at least one signaling element and the identified video format, a displacement data packing arrangement; and
retrieving displacement data according to the determined displacement data packing arrangement,
wherein the at least one signaling element includes a flag associated with the displacement data packing arrangement, and
wherein a value of the flag is inferred based on the identified video format for the compressed video.

9. The method of claim 8, wherein the at least one signaling element includes a packing type variable.

10. The method of claim 9, wherein, when the packing type variable indicates the displacement data is within a same plane, the displacement data packing arrangement includes that normal, tangent, and bi-tangent components of the displacement data are stored in a zeroth component of a displacement video frame.

11. The method of claim 10, wherein the normal, tangent, and bi-tangent components are interleaved in the zeroth component of the displacement video frame.

12. The method of claim 10, wherein the zeroth component of the displacement video frame is a luma component of the displacement video frame.

13. The method of claim 8, the method further comprising:
determine, based on the value of the flag, whether only a normal component of the displacement data is present in the bitstream for the compressed video or whether normal, tangent, and bi-tangent components of the displacement data are present in the bitstream for the compressed video;
when only the normal component of the displacement data is present in the bitstream for the compressed video, retrieving the displacement data from only a zeroth component of each displacement video frame; and when normal, tangent, and bi-tangent components of the displacement data are present in the bitstream for the compressed video, for each displacement video frame, retrieving, based on the identified video format, the displacement data from one of:

the zeroth component; or the zeroth, first, and second components.

14. The method of claim 13, wherein:

the value of the flag is inferred to be 1 when the video format is a 4:0:0 format; or the value of the flag is inferred to be 0 when the video format is a 4:4:4 format.

15. An apparatus comprising:

a communication interface; and a processor operably coupled to the communication interface, the processor configured to:

determine a video format for a video;

set at least one signaling element for the video, wherein the at least one signaling element is used to identify a displacement data packing arrangement for displacement data, wherein the at least one signaling element includes a flag associated with the displacement data packing arrangement, and wherein a value of the flag is set based on the determined video format for the video; and encode the video into a compressed video bitstream according to the displacement data packing arrangement.

16. The apparatus of claim 15, wherein, the at least one signaling element includes a packing type variable.

17. The apparatus of claim 16, wherein, when the packing type variable indicates the displacement data is within a same plane, the displacement data packing arrangement includes that normal, tangent, and bi-tangent components of the displacement data are stored in a zeroth component of a displacement video frame.

18. The apparatus of claim 17, wherein, to encode the video into the compressed video bitstream, the processor is further configured to interleave the normal, tangent, and bi-tangent components in the zeroth component of the displacement video frame.

19. The apparatus of claim 15, wherein the processor is further configured to:

set the value of the flag, the flag indicating whether only a normal component of the displacement data is present in the compressed video bitstream or whether normal, tangent, and bi-tangent components of the displacement data are present in the compressed video bitstream;

when the value of the flag indicates only the normal component of the displacement data is present in the compressed video bitstream, encode the displacement data in only a zeroth component of each displacement video frame; and when the value of the flag indicates the normal, tangent, and bi-tangent components of the displacement data are present in the compressed video bitstream, for each displacement video frame, encode, based on the determined video format, the displacement data in one of:

the zeroth component; or the zeroth, first, and second components.

20. The apparatus of claim 19, wherein:

the value of the flag is set to 1 when the video format is a 4:0:0 format; or the value of the flag is set to 0 when the video format is a 4:4:4 format.

* * * * *